(12) United States Patent
Kim et al.

(10) Patent No.: US 9,729,292 B2
(45) Date of Patent: Aug. 8, 2017

(54) METHOD AND APPARATUS FOR RECEIVING DATA IN WIRELESS COMMUNICATION SYSTEM SUPPORTING COOPERATIVE TRANSMISSION

(71) Applicant: LG ELECTRONICS INC., Seoul (KR)

(72) Inventors: Hyungtae Kim, Anyang-si (KR); Eunsun Kim, Anyang-si (KR); Hanjun Park, Anyang-si (KR); Hanbyul Seo, Anyang-si (KR); Jonghyun Park, Anyang-si (KR); Kijun Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/141,523

(22) Filed: Apr. 28, 2016

(65) Prior Publication Data

US 2016/0248560 A1 Aug. 25, 2016

Related U.S. Application Data

(63) Continuation of application No. 14/383,738, filed as application No. PCT/KR2013/008342 on Sep. 16, 2013.

(Continued)

(51) Int. Cl.
*H04W 72/04* (2009.01)
*H04L 5/00* (2006.01)
(Continued)

(52) U.S. Cl.
CPC .......... *H04L 5/0048* (2013.01); *H04B 7/024* (2013.01); *H04B 7/0626* (2013.01);
(Continued)

(58) Field of Classification Search
CPC ..... H04W 80/04; H04W 88/06; H04W 28/04; H04W 72/04; H04W 16/28
See application file for complete search history.

(56) References Cited

U.S. PATENT DOCUMENTS

2011/0149894 A1 6/2011 Luo et al.
2012/0120891 A1 5/2012 Mazzarese et al.
(Continued)

FOREIGN PATENT DOCUMENTS

CN 102368759 A 3/2012
JP 2012-44322 A 3/2012
(Continued)

OTHER PUBLICATIONS

Huawei, HiSilicon, "Signalling of PDSCH mapping for CoMP", R1-123109, 3GPP TSG RAN WG1 Meeting #70, Qingdao, China, Aug. 13-17, 2012.

(Continued)

*Primary Examiner* — Andrew Lee
(74) *Attorney, Agent, or Firm* — Dentons US LLP

(57) ABSTRACT

The present invention relates to a wireless communication system. A method for receiving data by a user equipment (UE) in a cooperative multi-point (CoMP) wireless communication system includes receiving downlink control information (DCI) that does not contain information indicating a transmission base station (BS) that actually transmits data among a plurality of BSs that participate in CoMP, receiving information about zero-power channel state information-reference signal (CSI-RS) of each of the plural BSs, and assuming that data is not mapped to a resource element of zero-power CSI-RS with a lowest index and receiving the data through a physical downlink control channel (PDSCH).

15 Claims, 11 Drawing Sheets

Related U.S. Application Data

(60) Provisional application No. 61/701,706, filed on Sep. 16, 2012.

(51) Int. Cl.
  *H04B 7/024* (2017.01)
  *H04B 7/06* (2006.01)

(52) U.S. Cl.
  CPC .......... *H04L 5/0005* (2013.01); *H04L 5/0035* (2013.01); *H04L 5/0053* (2013.01); *H04L 5/0057* (2013.01); *H04L 5/0094* (2013.01); *H04W 72/042* (2013.01); *H04W 72/0446* (2013.01); *H04L 5/0023* (2013.01); *H04L 5/0073* (2013.01)

(56) References Cited

U.S. PATENT DOCUMENTS

| | | |
|---|---|---|
| 2012/0188955 A1 | 7/2012 | Zhang |
| 2012/0201163 A1 | 8/2012 | Jöngren et al. |
| 2012/0208547 A1 | 8/2012 | Geirhofer et al. |
| 2012/0213261 A1 | 8/2012 | Sayana et al. |
| 2012/0220327 A1 | 8/2012 | Lee et al. |
| 2013/0114430 A1 | 5/2013 | Koivisto et al. |
| 2013/0155921 A1 | 6/2013 | Gomadam et al. |
| 2013/0194931 A1 | 8/2013 | Lee et al. |
| 2013/0242902 A1 | 9/2013 | Liu et al. |
| 2013/0258965 A1 | 10/2013 | Geirhofer et al. |
| 2013/0286867 A1 | 10/2013 | Davydov et al. |
| 2013/0301448 A1 | 11/2013 | Sayana et al. |
| 2013/0301542 A1 | 11/2013 | Krishnamurthy et al. |
| 2013/0336214 A1 | 12/2013 | Sayana et al. |
| 2014/0036796 A1 | 2/2014 | Etemad et al. |
| 2014/0044061 A1 | 2/2014 | Yue et al. |
| 2014/0092760 A1 | 4/2014 | Geirhofer et al. |
| 2014/0126496 A1 | 5/2014 | Sayana et al. |
| 2014/0204807 A1 | 7/2014 | Li et al. |
| 2014/0269460 A1 | 9/2014 | Papasakellariou et al. |
| 2014/0301271 A1 | 10/2014 | Xu et al. |
| 2014/0355470 A1 | 12/2014 | Nagata et al. |
| 2015/0117380 A1 | 4/2015 | Zhang et al. |
| 2015/0139022 A1 | 5/2015 | Mazzarese et al. |
| 2015/0173049 A1 | 6/2015 | Chen et al. |
| 2015/0223181 A1 | 8/2015 | Noh |
| 2015/0244444 A1 | 8/2015 | Mazzarese et al. |
| 2015/0256307 A1 | 9/2015 | Nagata et al. |
| 2015/0280877 A1 | 10/2015 | Chen et al. |
| 2015/0365152 A1 | 12/2015 | Frenne et al. |

FOREIGN PATENT DOCUMENTS

| | | |
|---|---|---|
| JP | 2014527779 A | 10/2014 |
| JP | 2015522955 A | 8/2015 |
| KR | 1020120016014 A | 2/2012 |
| KR | 1020120084243 A | 7/2012 |
| WO | 2011/106457 A2 | 9/2011 |
| WO | 2011142608 A2 | 11/2011 |
| WO | 2011145886 A2 | 11/2011 |
| WO | 2012/029245 A1 | 3/2012 |
| WO | 2012/109037 A2 | 8/2012 |

OTHER PUBLICATIONS

NEC Group, "On PDSCH RE mapping in CoMP", R1-123248, 3GPP TSG RAN WG1 Meeting #70, Qingdao, China, Aug. 13-17, 2012.
Panasonic, "Control Signalling for JT/DPS PDSCH mapping" R1-123282, 3GPP TSG RAN WG1 Meeting #70, Qingdao, China, Aug. 13-17, 2012.
Fujitsu, "Discussion on PDSCH RE mapping", R1-123301, 3GPP TSG RAN WG1 Meeting #70, Qingdao, China, Aug. 13-17, 2012.
New Postcom: "Remain issues of CoMP CQI", 3GPP TSG RAN WG1 Meeting #70, R1-123437, Aug. 13-17, 2012.
ZTE: "Discussion on interference measurement", 3GPP TSG RAN WG1 Meeting #69, R1-122868, May 21-25, 2012.
Intel Corporation: "CSI Process and Feedback Configuration for DL CoMP", 3GPP Draft R2-124988, TSG-RAN WG2 #79bis Bratislava, Slovakia, Sep. 8-12, 2012.
Qualcomm, Intel, Nokia: "Clarification on IMR-based interference measurement when CSI subframe sets are configured", 3GPP Draft R1-123930, TSG-RAN WG1 #70, Qingdao, China, Aug. 13-17, 2012.
NTT DOCOMO, Hitachi, Institute for INFOCOMM Research, Nokia: "Way Forward on Interference Measurement in REL-11", 3GPP Draft R1-123982, TSG-RAN WG1 #70, Qindao, China, Aug. 13-17, 2012.
Huawei, HiSilicon: "Interference measurement resource configuration and CQI calculation", 3GPP Draft R1-121947, TSG RAN WG1 Meeting #69 Prague, Czech Republic, May 21-25, 2012.
Samsung: "Interference Measurement Resource for Downlink CoMP", 3GPP Draft: R1-122236, TSG RAN WG1 Meeting #69 Prague, Czech Republic, May 21-25, 2012.
Nokia Siemens Networks, Nokia: "Remaining details of PDSCH rate matching behavior in relation to ZP CSI-RS resources, IMRs and NZP CSI-RS resource" 3GPP Draft: R1-125001, TSG-RAN WG1 Meeting #71 New Orleans, U.S., Nov. 12-16, 2012.
LG Electronics: "PDSCH RE mapping in relation to ZP CSI-RS resources and IMR" 3GPP Draft R1-124975, TSG-RAN WG1 Meeting #71 New Orleans, USA, Nov. 12-16, 2012.
LG Electronic. Ericsson. ST-Ericsson: "WF on PDSCH mapping on IMR REs" 3GPP Draft: R1-124647, TSG-RAN WG1 #70bis 'San Diego, USA, Oct. 8-12, 2012.
Ericsson, ST-Ericsson: "CoMP Network Operation Utilizing UE Emulated Interference" 3GPP R1-123848, TSG-RAN WG1 #70 Qingdao, China, Aug. 13-17, 2012.
Huawei et al: "Remaining Details on CSI RS", 3GPP Draft: R1-105840, TSG RAN WG1 meeting #63 Jacksonville, USA, Nov. 15-19, 2010.
Mediatek Inc: "Interference measurement and IMR configuration", 3GPP Draft: R1-123333, TSG RAN WG1 meeting #70 Quigdao, China, Aug. 13-17, 2012.
Huawei, HiSilicon: "Correction to PDSCH and EPDCCH mapping for CoMP in 36.213", R1-130430, 3GPP TSG RAN WG1 Meeting #72, St. Julian's, Malta, Jan. 28-Feb. 1, 2013.
ZTE: "Further considerations on DL-CoMP demodulation tests", R4-126160, 3GPP TSG RAN WG4 RAN4 #65, New Orleans, USA, Nov. 12-16, 2012.
NTT DOCOMO, 3GPP TSG RAN WG1, "Design Principle for ePDCCH Multiplexing," Meeting #70, Qingdao, China, Aug. 13-17, 2012, R1-123551, 3 pages.
Ad-hoc Chairman (Ericsson), 3GPP TSG RAN WG1, "Summary of Quasi co-located Antenna Ports Session," Meeting #70, Qingdao, China, Aug. 13-17, 2012, R1-123968, 6 pages.
DL CoMP Rapporteur (Samsung), 3GPP TSG RAN WG1, "RRC parameters for Downlink CoMP," Meeting #70, Dingdao, China, Aug. 13-17, 2012, R1-124032, 4 pages.
Fujitsu, 3GPP TSG RAN WG1, "Discussion on aperiodic CSI feedback for CoMP transmission," Meeting #70, Dingdao, China, Aug. 13-17, 2012, R1-123348, 4 pages.
Alcatel-Lucent, et al., 3GPP TSG RAN WG1, "CQI Definition and Interference Measurement for CoMP," Meeting #70, Qingdao, China, Aug. 13-17, 2012, R1-123137, 4 pages.
ZTE: "Downlink control signaling for CoMP", 3GPP TSG RAN WG1 Meeting #69, R1-122143, May 21-25, 2012.
ZTE: "Aperiodic CSI feedback modes for CoMP", 3GPP TSG RAN WG1 Meeting #70, R1-123381, Aug. 13-17, 2012.
ZTE: "Downlink control signaling for CoMP", 3GPP TSG RAN WG1 Meeting #70, R1-123843, Aug. 13-17, 2012.
Huawei, HiSilicon, Ericsson, ST-Ericsson: "Way Forward on higher-layer signaling for PDSCH mapping and quasi co-location", 3GPP TSG RAN WG1 #70bis, R1-124642, Oct. 8-12, 2012.
Nokia Siemens Networks, Nokia: "Interference measurement support for Rel-11", 3GPP TSG RAN WG1 Meeting #68, R1-120722, Feb. 6-10, 2012.

FIG. 5
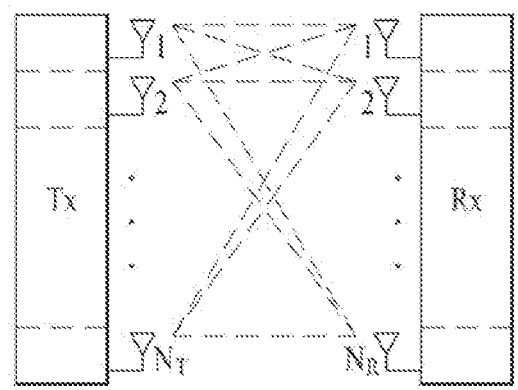
(a)
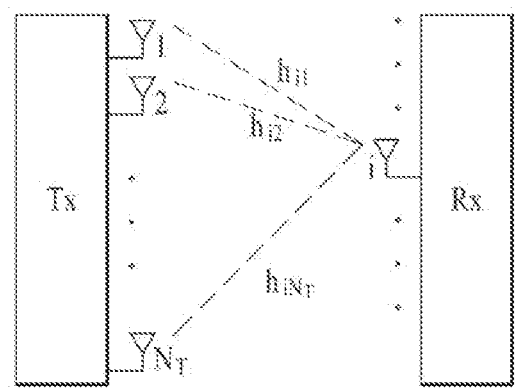
(b)

METHOD AND APPARATUS FOR RECEIVING DATA IN WIRELESS COMMUNICATION SYSTEM SUPPORTING COOPERATIVE TRANSMISSION

This application is a Continuation of U.S. patent application Ser. No. 14/383,738 filed Sep. 8, 2014, which is a 35 U.S.C. §371 National Stage Entry of International Application No. PCT/KR2013/008342 filed Sep. 16, 2013, which claims benefit of and priority to U.S. Provisional Application No. 61/701,706, all of which are incorporated by reference for all purposes as if fully set forth herein.

TECHNICAL FIELD

The present invention relates to a wireless communication system, and more particularly, to a method and apparatus for receiving data for receiving data in a cooperative multi-point (CoMP) wireless communication system, in which the UE assumes that data is not mapped to a resource element of a zero-power channel state information reference signal (CSI-RS) with a lowest index upon receiving downlink control information that does not contain information indicating a transmission eNB that actually transmits data

BACKGROUND ART

Multiple input multiple output (MIMO) increases the efficiency of data transmission and reception using multiple transmit antennas and multiple receive antennas instead of a single transmission antenna and a single reception antenna. A receiver receives data through multiple paths when multiple antennas are used, whereas the receiver receives data through a single antenna path when a single antenna is used. Accordingly, MIMO can increase a data transmission rate and throughput and improve coverage.

A single cell MIMO scheme can be classified into a single user-MIMO (SU-MIMO) scheme for receiving a downlink signal by a single UE in one cell and a multi user-MIMO (MU-MIMO) scheme for receiving a downlink signal by two or more UEs.

Research on cooperative multi-point (CoMP) for improving throughput of a UE located at a cell boundary by applying improved MIMO to a multi-cell environment is actively performed. The CoMP system can decrease inter-cell interference in a multi-cell environment and improve system performance.

Channel estimation refers to a procedure for compensating for signal distortion due to fading to restore a reception signal. Here, the fading refers to sudden fluctuation in signal intensity due to multipath-time delay in a wireless communication system environment. For channel estimation, a reference signal (RS) known to both a transmitter and a receiver is required. In addition, the RS can be referred to as a RS or a pilot signal according to applied standard.

A downlink RS is a pilot signal for coherent demodulation for a physical downlink shared channel (PDSCH), a physical control format indicator channel (PCFICH), a physical hybrid indicator channel (PHICH), a physical downlink control channel (PDCCH), etc. A downlink RS includes a common RS (CRS) shared by all user equipments (UEs) in a cell and a dedicated RS (DRS) for a specific UE. For a system (e.g., a system having extended antenna configuration LTE-A standard for supporting 8 transmission antennas) compared with a conventional communication system (e.g., a system according to LTE release-8 or 9) for supporting 4 transmission antennas, DRS based data demodulation has been considered for effectively managing RSs and supporting a developed transmission scheme. That is, for supporting data transmission through extended antennas, DRS for two or more layers can be defined. DRS is pre-coded by the same pre-coder as a pre-coder for data and thus a receiver can easily estimate channel information for data demodulation without separate precoding information.

A downlink receiver can acquire pre-coded channel information for extended antenna configuration through DRS but requires a separate RS other than DRS in order to non-precoded channel information. Accordingly, a receiver of a system according to LTE-A standard can define a RS for acquisition of channel state information (CSI), that is, CSI-RS.

DISCLOSURE

Technical Problem

An object of the present invention devised to solve the problem lies in a method and apparatus for receiving data in a cooperative multi-point (CoMP) wireless communication system.

It is to be understood that both the foregoing general description and the following detailed description of the present invention are exemplary and explanatory and are intended to provide further explanation of the invention as claimed.

Technical Solution

The object of the present invention can be achieved by providing a method for receiving data by a user equipment (UE) in a cooperative multi-point (CoMP) wireless communication system, the method including receiving downlink control information (DCI) that does not contain information indicating a transmission base station (BS) that actually transmits the data among a plurality of BSs that participate in CoMP, receiving information about zero-power channel state information-reference signal (CSI-RS) of each of the plural BSs, and assuming that data is not mapped to a resource element of zero-power CSI-RS with a lowest index and receiving the data through a physical downlink control channel (PDSCH).

The DCI may include DCI format 1A.

An interference measurement resource (IMR) for measuring interference in the CoMP may be present in a union of a resource element of zero-power CSI-RS of each of the plural BSs.

The receiving of the data may include assuming that the data is not mapped in the resource element of the zero-power CSI-RS with a lowest index among resource elements of the IMR, assuming that the data is mapped in resource elements of the remaining IMRs, and receiving the data.

The information about the zero-power CSI-RS may be received by radio resource control (RRC) signaling.

The information about the zero-power CSI-RS may include at least one of a period of a subframe and subframe offset for transmission of the zero-power CSI-RS.

In another aspect of the present invention, provided herein is a user equipment (UE) for receiving data in a cooperative multi-point (CoMP) wireless communication system, the UE including a radio frequency (RF) unit, and a processor, wherein the processor is configured to receive downlink control information (DCI) that does not contain information indicating a transmission base station (BS) that actually transmits the data among a plurality of BSs that participate in CoMP, to receive information about zero-power channel state information-reference signal (CSI-RS) of each of the plural BSs, and to assume that data is not mapped to a resource element of zero-power CSI-RS with a lowest index and receive the data through a physical downlink control channel (PDSCH).

The DCI may include DCI format 1A.

An interference measurement resource (IMR) for measuring interference in the CoMP may be present in a union of a resource element of zero-power CSI-RS of each of the plural BSs.

The processor may assume that the data is not mapped in the resource element of the zero-power CSI-RS with a lowest index among resource elements of the IMR, assume that the data is mapped in resource elements of the remaining IMRs, and receive the data.

The information about the zero-power CSI-RS may be received by radio resource control (RRC) signaling.

The information about the zero-power CSI-RS may include at least one of a period of a subframe and subframe offset for transmission of the zero-power CSI-RS.

It is to be understood that both the foregoing general description and the following detailed description of the present invention are exemplary and explanatory and are intended to provide further explanation of the invention as claimed.

Advantageous Effects

According to embodiments of the present invention, data can be more effectively received in a cooperative multi-point (CoMP) wireless communication system.

In addition, according to the embodiments of the present invention, a UE can assume that data is not mapped to a resource element of a zero-power channel state information reference signal (CSI-RS) with a lowest index upon receiving downlink control information that does not contain information indicating a transmission eNB that actually transmits data in a CoMP wireless communication system and receives data through a physical downlink shared channel (PDSCH).

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

In the drawings:

FIG. 5 illustrates the configuration of a MIMO communication system having multiple antennas.

BEST MODE

Figure 1:
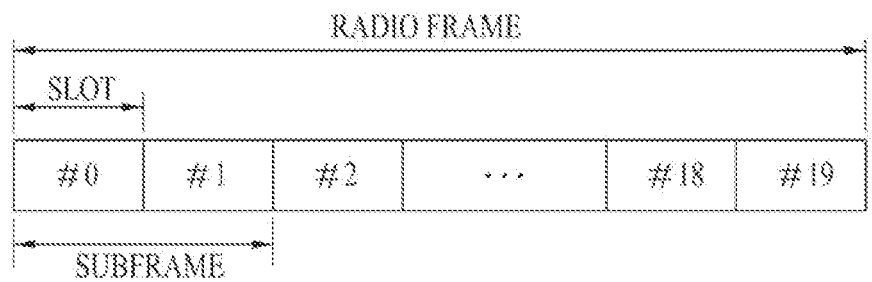
FIG. 1 illustrates the type-1 radio frame structure.

The following embodiments are proposed by combining constituent components and characteristics of the present invention according to a predetermined format. The individual constituent components or characteristics should be considered optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary.

The embodiments of the present invention are disclosed on the basis of a data communication relationship between a base station and a terminal. In this case, the base station is used as a terminal node of a network via which the base station can directly communicate with the terminal. Specific operations to be conducted by the base station in the present invention may also be conducted by an upper node of the base station as necessary.

In other words, it will be obvious to those skilled in the art that various operations for enabling the base station to communicate with the terminal in a network composed of several network nodes including the base station will be conducted by the base station or other network nodes other than the base station. The term "base station (BS)" may be replaced with a fixed station, Node-B, eNode-B (eNB), or an access point as necessary. The term "relay" may be replaced with the terms relay node (RN) or relay station (RS). The term "terminal" may also be replaced with a user equipment (UE), a mobile station (MS), a mobile subscriber station (MSS) or a subscriber station (SS) as necessary.

It should be noted that specific terms disclosed in the present invention are proposed for convenience of description and better understanding of the present invention, and the use of these specific terms may be changed to other formats within the technical scope or spirit of the present invention.

In some instances, well-known structures and devices are omitted in order to avoid obscuring the concepts of the present invention and important functions of the structures and devices are shown in block diagram form. The same reference numbers will be used throughout the drawings to refer to the same or like parts.

Exemplary embodiments of the present invention are supported by standard documents disclosed for at least one of wireless access systems including an institute of electrical and electronics engineers (IEEE) 802 system, a 3rd generation partnership project (3GPP) system, a 3GPP long term evolution (LTE) system, an LTE-advanced (LTE-A) system, and a 3GPP2 system. In particular, steps or parts, which are not described to clearly reveal the technical idea of the present invention, in the embodiments of the present invention may be supported by the above documents. All terminology used herein may be supported by at least one of the above-mentioned documents.

The following embodiments of the present invention can be applied to a variety of wireless access technologies, for example, code division multiple access (CDMA), frequency division multiple access (FDMA), time division multiple access (TDMA), orthogonal frequency division multiple access (OFDMA), single carrier frequency division multiple access (SC-FDMA), and the like. CDMA may be embodied through wireless (or radio) technology such as universal terrestrial radio access (UTRA) or CDMA2000. TDMA may be embodied through wireless (or radio) technology such as global system for mobile communication (GSM)/general packet radio service (GPRS)/enhanced data rates for GSM evolution (EDGE). OFDMA may be embodied through wireless (or radio) technology such as institute of electrical and electronics engineers (IEEE) 802.11 (Wi-Fi), IEEE 802.16 (WiMAX), IEEE 802-20, and evolved UTRA (E-UTRA). UTRA is a part of universal mobile telecommunications system (UMTS). 3rd generation partnership project (3GPP) long term evolution (LTE) is a part of E-UMTS (Evolved UMTS), which uses E-UTRA. 3GPP LTE employs OFDMA in downlink and employs SC-FDMA in uplink. LTE-Advanced (LTE-A) is an evolved version of 3GPP LTE. WiMAX can be explained by IEEE 802.16e (wirelessMAN-OFDMA reference system) and advanced IEEE 802.16m (wirelessMAN-OFDMA advanced system). For clarity, the following description focuses on IEEE 802.11 systems. However, technical features of the present invention are not limited thereto.

With reference to FIG. 1, the structure of a downlink radio frame will be described below.

In a cellular orthogonal frequency division multiplexing (OFDM) wireless packet communication system, uplink and/or downlink data packets are transmitted in subframes. One subframe is defined as a predetermined time period including a plurality of OFDM symbols. The 3GPP LTE standard supports a type-1 radio frame structure applicable to frequency division duplex (FDD) and a type-2 radio frame structure applicable to time division duplex (TDD).

FIG. 1 illustrates the type-1 radio frame structure. A downlink radio frame is divided into 10 subframes. Each subframe is further divided into two slots in the time domain. A unit time during which one subframe is transmitted is defined as a Transmission Time Interval (TTI). For example, one subframe may be 1 ms in duration and one slot may be 0.5 ms in duration. A slot includes a plurality of OFDM symbols in the time domain and a plurality of resource blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a cyclic prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease inter-symbol interference (ISI).

In the case of the normal CP, one subframe includes 14 OFDM symbols because one slot includes 7 OFDM symbols. The first two or three OFDM symbols of each subframe may be allocated to a physical downlink control channel (PDCCH) and the other OFDM symbols may be allocated to a physical downlink shared channel (PDSCH).

The above-described radio frame structures are purely exemplary and thus it is to be noted that the number of subframes in a radio frame, the number of slots in a subframe, or the number of symbols in a slot may vary.

Figure 2:
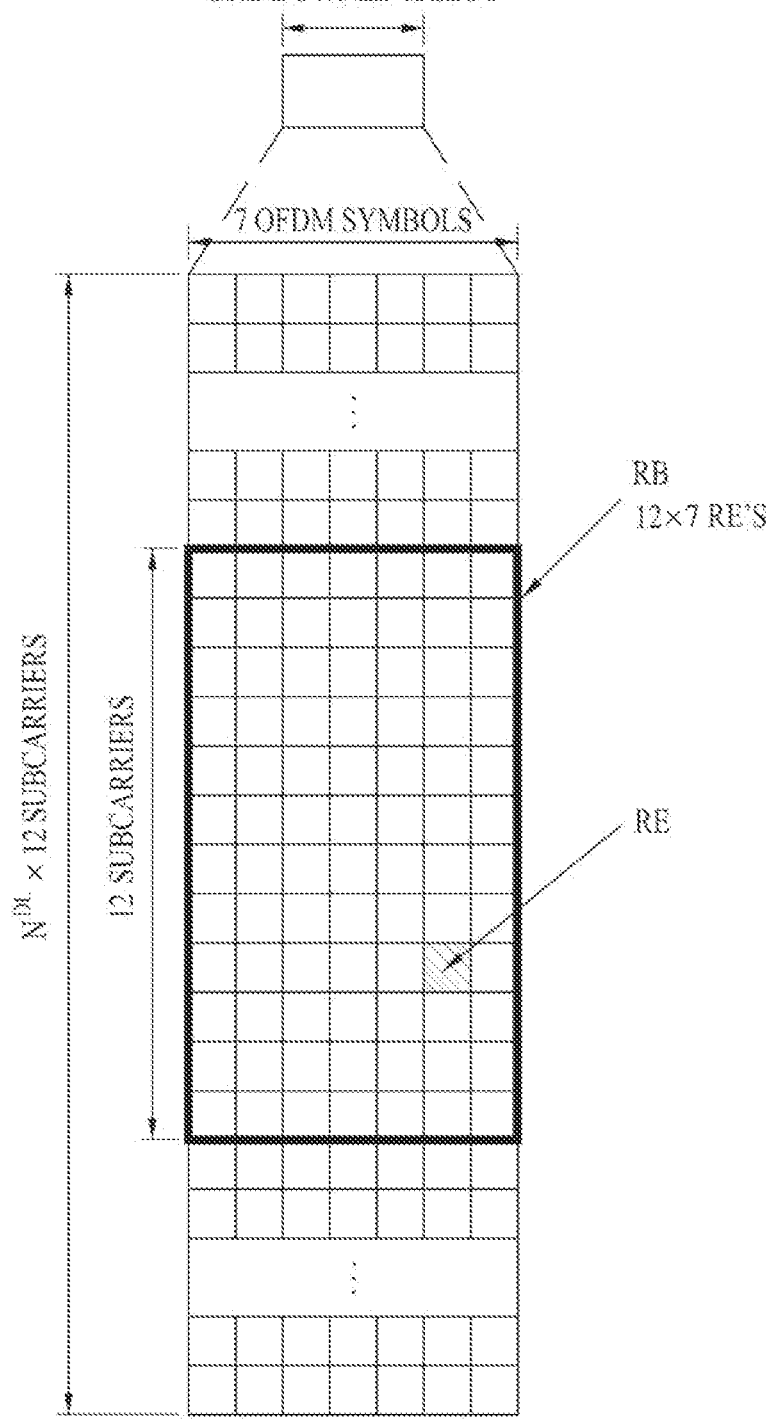
FIG. 2 illustrates the structure of a downlink resource grid for the duration of one downlink slot.

FIG. 2 illustrates the structure of a downlink resource grid for the duration of one downlink slot. FIG. 2 corresponds to a case in which an OFDM includes normal CP. Referring to FIG. 2, a downlink slot includes a plurality of OFDM symbols in the time domain and includes a plurality of RBs in the frequency domain. Here, one downlink slot includes 7 OFDM symbols in the time domain and an RB includes 12 subcarriers in the frequency domain, which does not limit the scope and spirit of the present invention. An element on a resource grid is referred to as a resource element (RE). For example, RE a(k,l) refers to RE location in a $k_{th}$ subcarrier and a first OFDM symbol. In the case of the normal CP, one RB includes 12×7 REs (in the case of the extended CP, one RB includes 12×6 REs). An interval between subcarriers is 15 kHz and thus one RB includes about 180 kHz in the frequency domain. $N^{DL}$ is number of RBs in a downlink slot. $N^{DL}$ depends on a downlink transmission bandwidth configured by BS scheduling.

Figure 3:
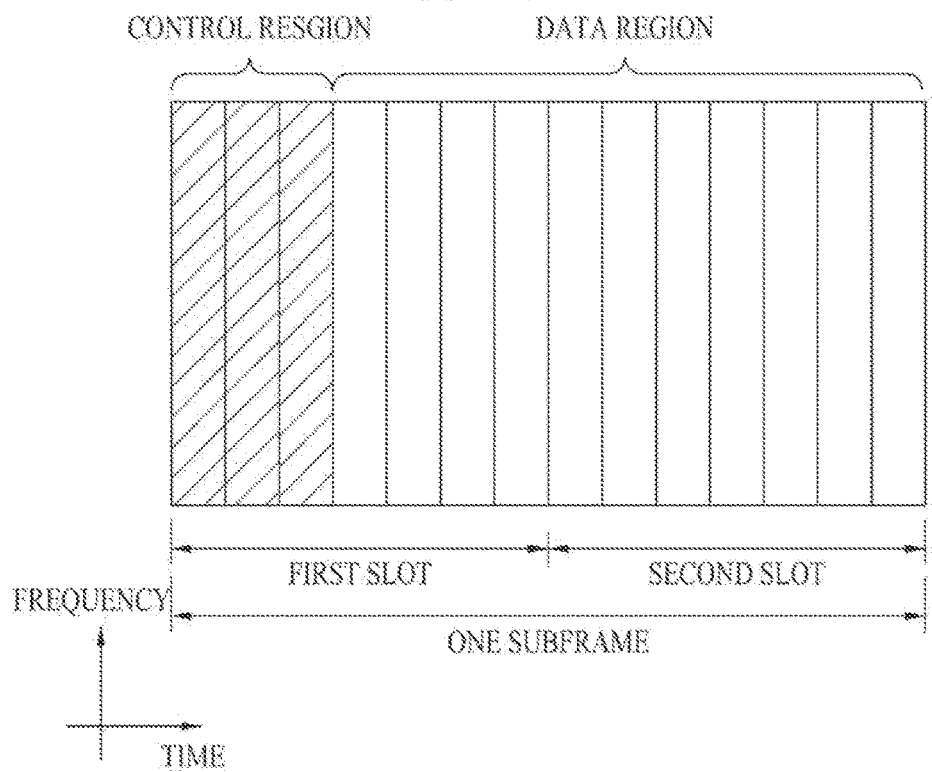
FIG. 3 illustrates the structure of a downlink subframe.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. A basic unit of transmission is one subframe. That is, a PDCCH and a PDSCH are allocated across two slots. Downlink control channels used in the 3GPP LTE system include, for example, a physical control format indicator channel (PCFICH), a physical downlink control channel (PDCCH), and a physical hybrid automatic repeat request (HARQ) indicator channel (PHICH). The PCFICH is located in the first OFDM symbol of a subframe, carrying information about the number of OFDM symbols used for transmission of control channels in the subframe. The PHICH delivers an HARQ ACKnowledgment/Negative ACKnowledgment (ACK/NACK) signal in response to an uplink transmission. Control information carried on the PDCCH is called downlink control information (DCI). The DCI transports uplink or downlink scheduling information, or uplink transmission power control commands for UE groups. The PDCCH delivers information about resource allocation and a transport format for a downlink shared channel (DL-SCH), resource allocation information about an uplink shared channel (UL-SCH), paging information of a paging channel (PCH), system information on the DL-SCH, information about resource allocation for a higher-layer control message such as a random access response transmitted on the PDSCH, a set of transmission power control commands for individual UEs of a UE group, transmission power control information, voice over Internet protocol (VoIP) activation information, etc. A plurality of PDCCHs may be transmitted in the control region. A UE may monitor a plurality of PDCCHs. A PDCCH is formed by aggregating one or more consecutive Control Channel Elements (CCEs). A CCE is a logical allocation unit used to provide a PDCCH at a coding rate based on the state of a radio channel. A CCE corresponds to a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a cyclic redundancy check (CRC) to control information. The CRC is masked by an identifier (ID) known as a radio network temporary identifier (RNTI) according to the owner or usage of the PDCCH. When the PDCCH is directed to a specific UE, its CRC may be masked by a cell-RNTI (C-RNTI) of the UE. When the PDCCH is for a paging message, the CRC of the PDCCH may be masked by a paging indicator identifier (P-RNTI). When the PDCCH carries system information, particularly, a system information block (SIB), its CRC may be masked by a system information ID and a system information RNTI (SI-RNTI). To indicate that the PDCCH carries a random access response in response to a random access preamble transmitted by a UE, its CRC may be masked by a random access-RNTI (RA-RNTI).

Figure 4:
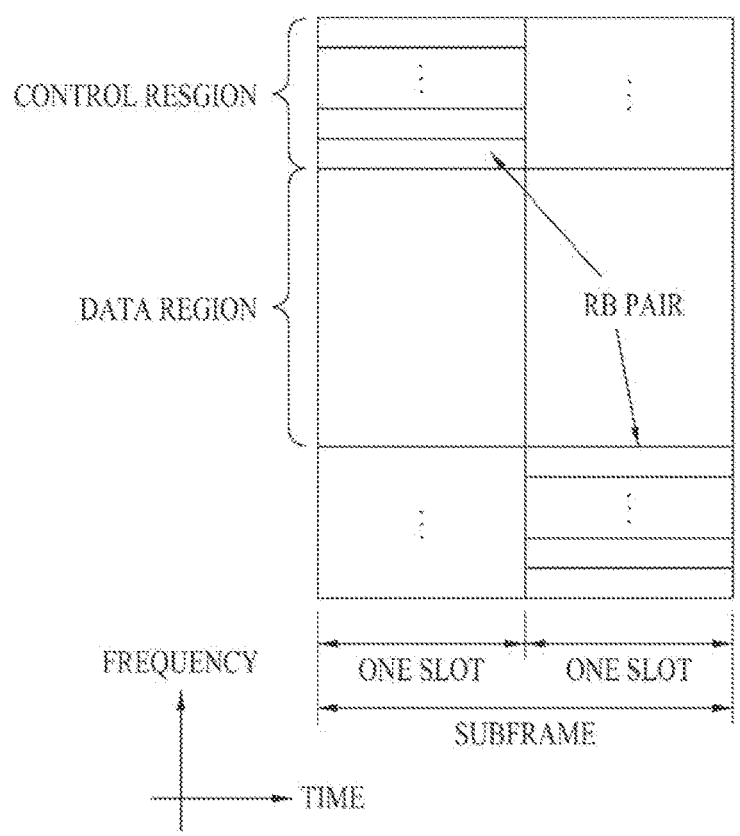
FIG. 4 illustrates the structure of an uplink subframe.

FIG. 4 illustrates the structure of an uplink subframe. An uplink subframe may be divided into a control region and a data region in the frequency domain. A Physical Uplink Control Channel (PUCCH) carrying uplink control information is allocated to the control region and a physical uplink shared channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Modeling of MIMO System

A multiple input multiple output (MIMO) system increases transmission/reception efficiency of data using multiple transmission (Tx) antennas and multiple reception (Rx) antennas. MIMO technology does not depend upon a single antenna path in order to receive all messages but instead can combine a plurality of data fragments received through a plurality of antennas and receive all data.

MIMO technology includes a spatial diversity scheme, a spatial multiplexing scheme, etc. The spatial diversity scheme can increase transmission reliability or can widen a cell diameter with diversity gain and thus is appropriate for data transmission of a UE that moves a high speed. The spatial multiplexing scheme can simultaneously transmit different data so as to increase data transmission rate without increase in a system bandwidth.

FIG. 5 illustrates the configuration of a MIMO communication system having multiple antennas. As illustrated in FIG. 5(a), the simultaneous use of a plurality of antennas at both the transmitter and the receiver increases a theoretical channel transmission capacity, compared to use of a plurality of antennas at only one of the transmitter and the receiver. Therefore, transmission rate may be increased and frequency efficiency may be remarkably increased. As channel transmission rate is increased, transmission rate may be increased, in theory, to the product of a maximum transmission rate $R_o$ that may be achieved with a single antenna and a transmission rate increase Ri.

$$R_i = \min(N_T, N_R) \quad \text{[Equation 1]}$$

For instance, a MIMO communication system with four Tx antennas and four Rx antennas may achieve a four-fold increase in transmission rate theoretically, relative to a single-antenna system. Since the theoretical capacity increase of the MIMO system was verified in the middle 1990s, many techniques have been actively proposed to increase data rate in real implementation. Some of the techniques have already been reflected in various wireless communication standards for 3G mobile communications, future-generation wireless local area network (WLAN), etc.

Concerning the research trend of MIMO up to now, active studies are underway in many respects of MIMO, inclusive of studies of information theory related to calculation of multi-antenna communication capacity in diverse channel environments and multiple access environments, studies of measuring MIMO radio channels and MIMO modeling, studies of time-space signal processing techniques to increase transmission reliability and transmission rate, etc.

Communication in a MIMO system will be described in detail through mathematical modeling. It is assumed that $N_T$ Tx antennas and $N_R$ Rx antennas are present in the system.

Regarding a transmission signal, up to $N_T$ pieces of information can be transmitted through the $N_T$ Tx antennas, as expressed in Equation 2 below.

$$s = [s_1, s_2, \ldots, s_{N_T}]^T \quad \text{[Equation 2]}$$

A different transmission power may be applied to each piece of transmission information, $s_1, s_2, \ldots, s_{N_T}$. Let the transmission power levels of the transmission information be denoted by $P_1, P_2, \ldots, P_{N_T}$, respectively. Then the transmission power-controlled transmission information vector is given as $$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

The transmission power-controlled transmission information vectors $\hat{s}$ may be expressed as follows, using a diagonal matrix P of transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

$N_T$ transmission signals $x_1, x_2, \ldots, x_{N_T}$ may be generated by multiplying the transmission power-controlled information vector $\hat{s}$ by a weight matrix W. The weight matrix W functions to appropriately distribute the transmission information to the Tx antennas according to transmission channel states, etc. These $N_T$ transmission signals $x_1, x_2, \ldots, x_{N_T}$ are represented as a vector x, which may be determined by Equation 5 below.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & \ddots & \\ w_{N_T1} & w_{N_T2} & \cdots & w_{N_TN_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad \text{[Equation 5]}$$

Here, $w_{ij}$ if refers to a weight between an $i_{th}$ Tx antenna and $j_{th}$ information.

A reception signal x may be considered in different ways according to two cases (e.g., spatial diversity and spatial multiplexing). In the case of spatial multiplexing, different signals are multiplexed and the multiplexed signals are transmitted to a receiver, and thus, elements of information vector (s) have different values. In the case of spatial diversity, the same signal is repeatedly transmitted through a plurality of channel paths and thus elements of information vectors (s) have the same value. A hybrid scheme of spatial multiplexing and spatial diversity can also be considered. That is, that same signal may be transmitted through three Tx antennas and the remaining signals may be spatial-multiplexed and transmitted to a receiver.

In the case of $N_R$ Rx antennas, a reception signal of each antenna may be expressed as the vector shown in Equation 6 below.

$$y=[y_1,y_2,\ldots,y_{N_R}]^T \qquad \text{[Equation 6]}$$

When a channel modeling is executed in the MIMO communication system, individual channels can be distinguished from each other according to transmission/reception (Tx/Rx) antenna indexes. A channel passing the range from a Tx antenna j to an Rx antenna i is denoted by $h_{ij}$. It should be noted that the index order of the channel $h_{ij}$ is located before a reception (Rx) antenna index and is located after a transmission (Tx) antenna index.

FIG. 5(b) illustrates channels from $N_T$ Tx antennas to an Rx antenna i. The channels may be collectively represented in the form of vector and matrix. Referring to FIG. 5(b), the channels passing the range from the $N_T$ Tx antennas to the Rx antenna i can be represented by the Equation 7 below.

$$h_i^T=[h_{i1},h_{i2},\ldots,h_{iN_T}] \qquad \text{[Equation 7]}$$

All channels passing the range from the $N_T$ Tx antennas to $N_R$ Rx antennas are denoted by the matrix shown in Equation 8 below.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & \ddots & \\ h_{N_R1} & h_{N_R2} & \ldots & h_{N_RN_T} \end{bmatrix} \qquad \text{[Equation 8]}$$

Additive white Gaussian noise (AWGN) is added to an actual channel which has passed the channel matrix. The AWGN ($n_1, n_2, \ldots, n_{N_R}$) added to each of $N_R$ reception (Rx) antennas can be represented by Equation 9 below.

$$n=[n_1,n_2,\ldots,n_{N_R}]^T \qquad \text{[Equation 9]}$$

A reception signal calculated by the above-mentioned equations can be represented by Equation 10 below.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & \ddots & \\ h_{N_R1} & h_{N_R2} & \ldots & h_{N_RN_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = \qquad \text{[Equation 10]}$$

$$Hx+n$$

The number of rows and the number of columns of a channel matrix H indicating a channel condition are determined by the number of Tx/Rx antennas. In the channel matrix H, the number of rows is equal to the number ($N_R$) of Rx antennas, and the number of columns is equal to the number ($N_T$) of Tx antennas. Namely, the channel matrix H is denoted by an $N_R \times N_T$ matrix.

The rank of a matrix is defined as the smaller between the number of independent rows and the number of independent columns in the channel matrix. Accordingly, the rank of the channel matrix is not larger than the number of rows or columns of the channel matrix. The rank of a channel matrix H, rank(H) satisfies the following constraint.

$$\text{rank}(H) \leq \min(N_T, N_R) \qquad \text{[Equation 11]}$$

For MIMO transmission, 'rank' indicates the number of paths for independent transmission of signals and 'number of layers' indicates the number of streams transmitted through each path. In general, a transmission end transmits layers, the number of which corresponds to the number of ranks used for signal transmission, and thus, rank have the same meaning as number of layers unless there is no different disclosure.

Reference Signals (RSs)

In a wireless communication system, a packet is transmitted on a radio channel. In view of the nature of the radio channel, the packet may be distorted during the transmission. To receive the signal successfully, a receiver should compensate for the distortion of the reception signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In the case of data transmission and reception through multiple antennas, knowledge of channel states between transmission (Tx) antennas and reception (Rx) antennas is required for successful signal reception. Accordingly, an RS should be transmitted through each Tx antenna.

RSs in a mobile communication system may be divided into two types according to their purposes: RS for channel information acquisition and RS for data demodulation. Since its purpose lies in that a UE acquires downlink channel information, the former should be transmitted in a broad band and received and measured even by a UE that does not receive downlink data in a specific subframe. This RS is also used in a situation like handover. The latter is an RS that an eNB transmits along with downlink data in specific resources. A UE can estimate a channel by receiving the RS and accordingly can demodulate data. The RS should be transmitted in a data transmission area.

A legacy 3GPP LTE (e.g., 3GPP LTE release-8) system defines two types of downlink RSs for unicast services: a common RS (CRS) and a dedicated RS (DRS). The CRS is used for acquisition of information about a channel state, measurement of handover, etc. and may be referred to as a cell-specific RS. The DRS is used for data demodulation and may be referred to as a UE-specific RS. In a legacy 3GPP LTE system, the DRS is used for data demodulation only and the CRS can be used for both purposes of channel information acquisition and data demodulation.

CRSs, which are cell-specific, are transmitted across a wideband in every subframe. According to the number of Tx antennas at an eNB, the eNB may transmit CRSs for up to four antenna ports. For instance, an eNB with two Tx antennas transmits CRSs for antenna port 0 and antenna port 1. If the eNB has four Tx antennas, it transmits CRSs for respective four Tx antenna ports, antenna port 0 to antenna port 3.

Figure 6:
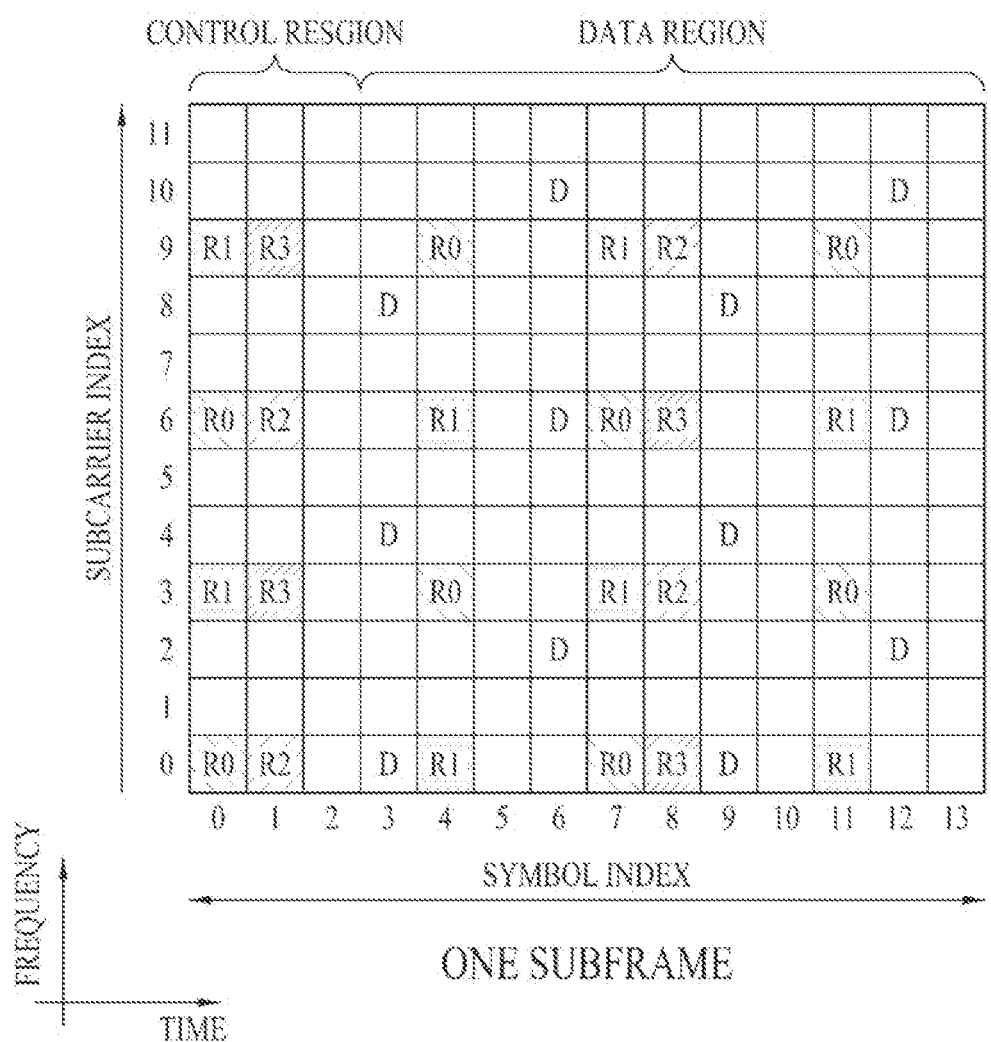
FIG. 6 illustrates a conventional CRS and DRS pattern.

FIG. 6 illustrates a CRS and DRS pattern for an RB (including 14 OFDM symbols in time by 12 subcarriers in frequency in case of a normal CP) in a system where an eNB has four Tx antennas. In FIG. 6, REs labeled with 'R0', 'R1', 'R2' and 'R3' represent the positions of CRSs for antenna port 0 to antenna port 4, respectively. REs labeled with 'D' represent the positions of DRS s defined in the LTE system.

The LTE-A system, an evolution of the LTE system, can support up to eight Tx antennas. Therefore, it should also support RSs for up to eight Tx antennas. Because downlink RSs are defined only for up to four Tx antennas in the LTE system, RSs should be additionally defined for five to eight Tx antenna ports, when an eNB has five to eight downlink Tx antennas in the LTE-A system. Both RSs for channel measurement and RSs for data demodulation should be considered for up to eight Tx antenna ports.

One of significant considerations for design of the LTE-A system is backward compatibility. Backward compatibility is a feature that guarantees a legacy LTE terminal to operate normally even in the LTE-A system. If RSs for up to eight Tx antenna ports are added to a time-frequency area in which CRSs defined by the LTE standard are transmitted across a total frequency band in every subframe, RS overhead becomes huge. Therefore, new RSs should be designed for up to eight antenna ports in such a manner that RS overhead is reduced.

Largely, new two types of RSs are introduced to the LTE-A system. One type is CSI-RS serving the purpose of channel measurement for selection of a transmission rank, a modulation and coding scheme (MCS), a precoding matrix index (PMI), etc. The other type is demodulation RS (DM RS) for demodulation of data transmitted through up to eight Tx antennas.

Compared to the CRS used for both purposes of measurement such as channel measurement and measurement for handover and data demodulation in the legacy LTE system, the CSI-RS is designed mainly for channel estimation, although it may also be used for measurement for handover. Since CSI-RSs are transmitted only for the purpose of acquisition of channel information, they may not be transmitted in every subframe, unlike CRSs in the legacy LTE system. Accordingly, CSI-RSs may be configured so as to be transmitted intermittently (e.g. periodically) along the time axis, for reduction of CSI-RS overhead.

When data is transmitted in a downlink subframe, DM RSs are also transmitted dedicatedly to a UE for which the data transmission is scheduled. Thus, DM RSs dedicated to a particular UE may be designed such that they are transmitted only in a resource area scheduled for the particular UE, that is, only in a time-frequency area carrying data for the particular UE.

Figure 7:
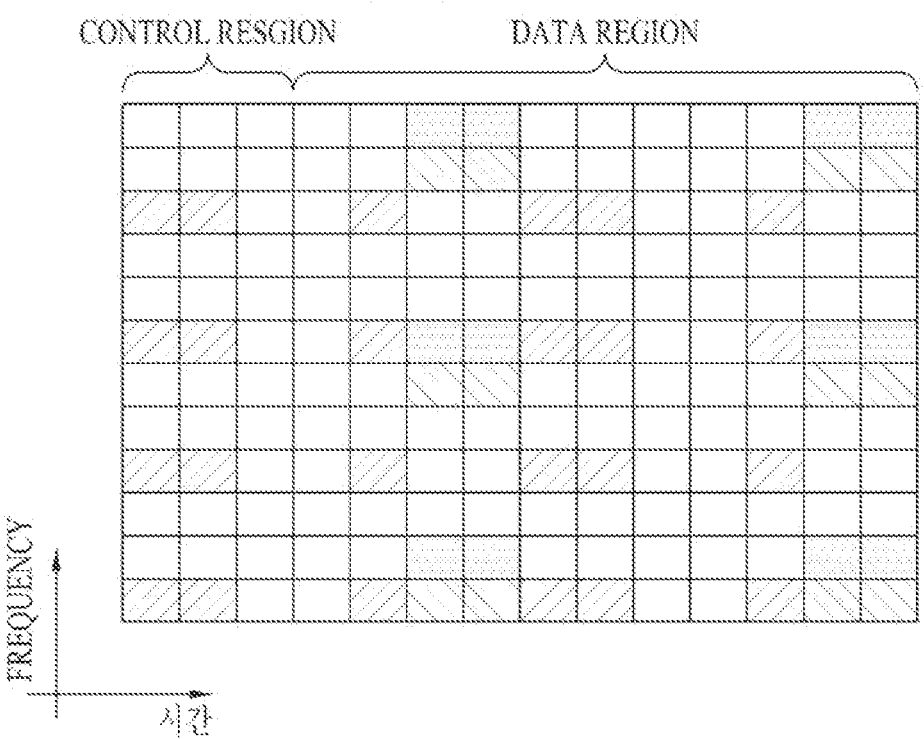
FIG. 7 illustrates an exemplary DM RS pattern defined for the LTE-A system.

FIG. 7 illustrates an exemplary DM RS pattern defined for the LTE-A system. In FIG. 7, the positions of REs carrying DM RSs in an RB carrying downlink data (an RB having 14 OFDM symbols in time by 12 subcarriers in frequency in case of a normal CP) are marked. DM RS s may be transmitted for additionally defined four antenna ports, antenna port 7 to antenna port 10 in the LTE-A system. DM RSs for different antenna ports may be identified by their different frequency resources (subcarriers) and/or different time resources (OFDM symbols). This means that the DM RSs may be multiplexed in frequency division multiplexing (FDM) and/or time division multiplexing (TDM). If DM RSs for different antenna ports are positioned in the same time-frequency resources, they may be identified by their different orthogonal codes. That is, these DM RSs may be multiplexed in Code Division Multiplexing (CDM). In the illustrated case of FIG. 7, DM RSs for antenna port 7 and antenna port 8 may be located on REs of DM RS CDM group 1 through multiplexing based on orthogonal codes. Similarly, DM RSs for antenna port 9 and antenna port 10 may be located on REs of DM RS CDM group 2 through multiplexing based on orthogonal codes.

Figure 8:
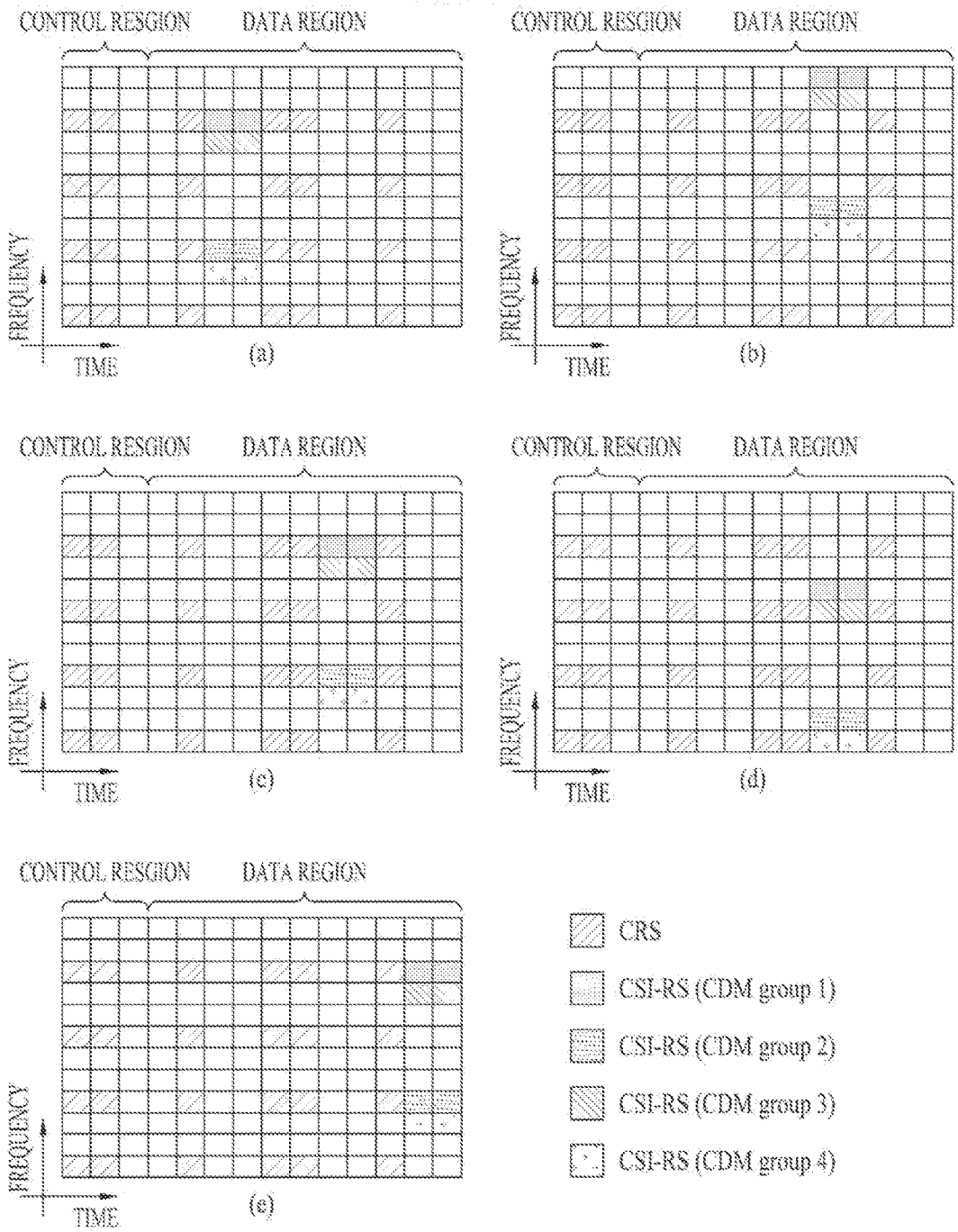
FIG. 8 illustrates exemplary CSI-RS patterns.

FIG. 8 illustrates exemplary CSI-RS patterns defined for the LTE-A system. In FIG. 8, the positions of REs carrying CSI-RSs in an RB carrying downlink data (an RB having 14 OFDM symbols in time by 12 subcarriers in frequency in case of a normal CP) are marked. One of the CSI-RS patterns illustrated in FIGS. 8(a) to 8(e) is available for any downlink subframe. CSI-RSs may be transmitted for eight antenna ports supported by the LTE-A system, antenna port 15 to antenna port 22. CSI-RSs for different antenna ports may be identified by their different frequency resources (subcarriers) and/or different time resources (OFDM symbols). This means that the CSI-RSs may be multiplexed in FDM and/or TDM. CSI-RSs positioned in the same time-frequency resources for different antenna ports may be identified by their different orthogonal codes. That is, these DM RSs may be multiplexed in CDM. In the illustrated case of FIG. 8(a), CSI-RSs for antenna port 15 and antenna port 16 may be located on REs of CSI-RS CDM group 1 through multiplexing based on orthogonal codes. CSI-RSs for antenna port 17 and antenna port 18 may be located on REs of CSI-RS CDM group 2 through multiplexing based on orthogonal codes. CSI-RSs for antenna port 19 and antenna port 20 may be located on REs of CSI-RS CDM group 3 through multiplexing based on orthogonal codes. CSI-RS s for antenna port 21 and antenna port 22 may be located on REs of CSI-RS CDM group 4 through multiplexing based on orthogonal codes. The same principle described with reference to FIG. 8(a) is applicable to the CSI-RS patterns illustrated in FIGS. 8(b) to 8(e).

Figure 9:
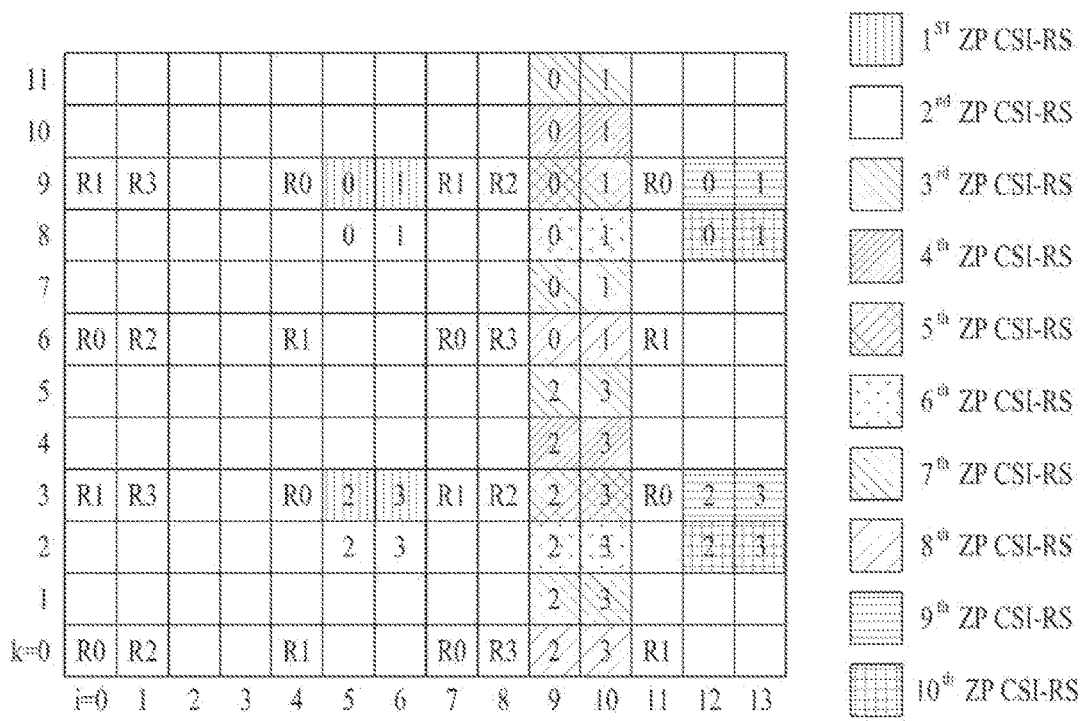
FIG. 9 is a diagram illustrating an example of a zero power (ZP) CSI-RS pattern.

FIG. 9 is a diagram illustrating an example of a zero power (ZP) CSI-RS pattern defined in an LTE-A system. The use of the ZP CSI-RS can be largely classified into two types. A first type of ZP CSI-RS is for enhancing CSI-RS performance. That is, one network may performs muting on CSI-RS RE of another network in order to enhance the measurement performance of CSI-RS of another network and may configure and signal the muted RE as ZP CSI-RS such that a UE of the network may appropriately perform rate matching. A second type of ZP CSI-RS is for interference measurement for calculation of CoMP CQI. That is, some networks may perform muting on ZP CRS-RS RE, and the UE may measure interference from ZP CSI-RS to calculate CoMP CQI.

RS patterns of FIGS. 6 to 9 are purely exemplary. Various embodiments of the present invention are not limited to specific RS patterns. That is, when different RS patterns from in FIGS. 6 to 9 are defined and used, the various embodiments of the present invention may be applied in the same way.

CSI Feedback of Cooperative Multipoint Transmission/Reception (CoMP) System

Hereinafter, CoMP will be described.

A post LTE-A system tries to use a method for allowing cooperation between plural cells to enhance system performance. This method is referred to as cooperative multipoint transmission/reception (CoMP). CoMP refers to a scheme in which two or more BSs, access points, or cells communicate with a UE in cooperation with each other for smooth communication between a BS, an access point, or a cell with a specific UE. According to the present invention, a BS, an access point, and a cell may be used in the same meaning.

It is known that Inter-Cell Interference (ICI) generally degrades the performance of a UE at a cell edge and average sector throughput in a multi-cellular environment with a frequency reuse factor of 1. To offer an appropriate throughput performance to a cell-edge UE in an environment constrained by interference, a simple ICI mitigation technique such as UE-specific power control-based fractional frequency reuse (FFR) is used in the conventional LTE system. However, it may be preferred to reduce the ICI or reuse the ICI as a desired signal for the UE, rather than to decrease the utilization of frequency resources per cell. For this purpose, CoMP transmission techniques may be adopted.

Figure 10:
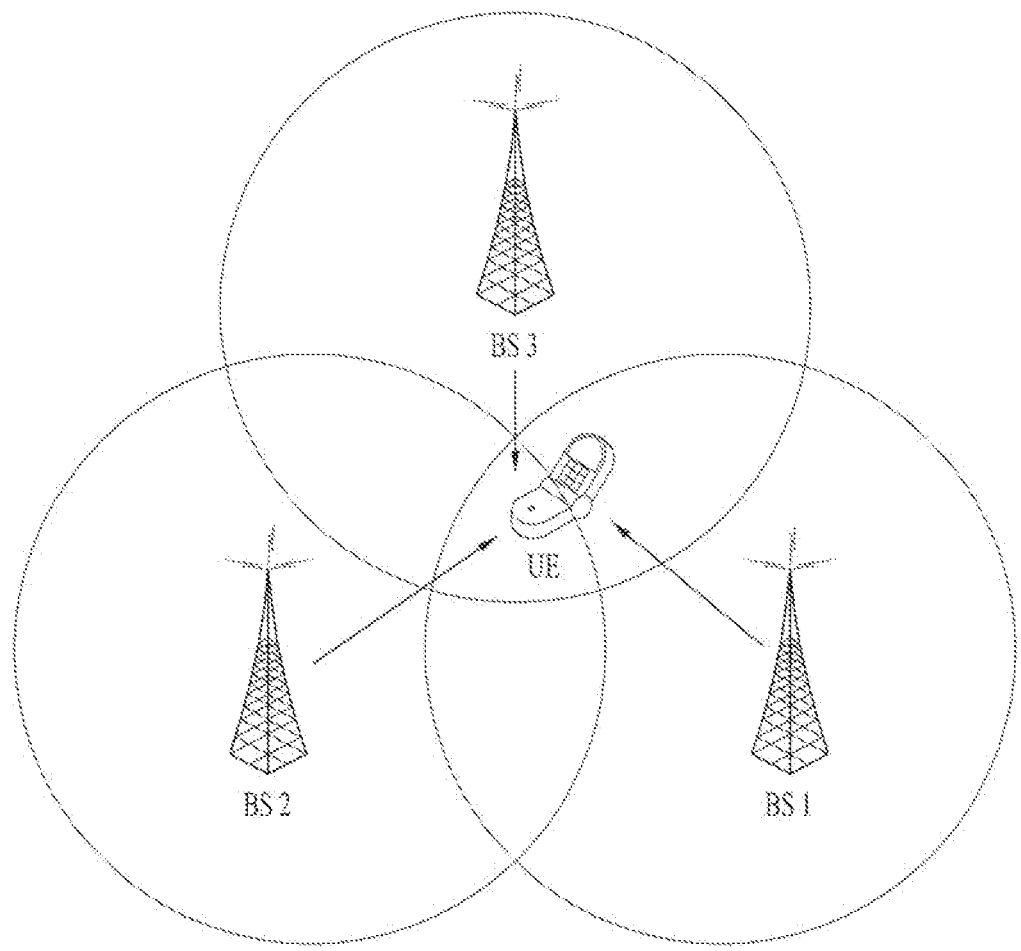
FIG. 10 illustrates an example of CoMP.

FIG. 10 illustrates an example of CoMP. Referring to FIG. 10, a wireless communication system includes a plurality of BSs BS1, BS2, and BS3 which perform CoMP and a UE. The plural BSs BS1, BS2, and BS3 which perform CoMP may effectively transmit data to the UE in cooperation with each other.

A CoMP transmission scheme may be classified into CoMP-joint processing (JP) via data sharing and CoMP-cooperative scheduling/beamforming (CS/CB).

According to CoMP-JP applicable to downlink, a UE may simultaneously receive data from a plurality of BSs that perform a CoMP transmission scheme and may combine signals received from the BSs to enhance reception performance (joint transmission; JT). In addition, one of BSs that perform a CoMP transmission scheme may transmit data to the UE at a specific point of time (Dynamic point selection; DPS). According to CoMP-CS/CB, the UE may momentarily receive data from one BS, that is, a serving BS via beamforming.

When CoMP-JP is applied to uplink, a plurality of BSs may simultaneously receive a PUSCH signal from a BS (Joint Reception; JR). On the other hand, in case of CoMP-CS/CB, only one BS may receive a PUSCH. Cooperative cells (or BSs) may determine to use cooperative scheduling/beamforming (CS/CB).

A UE using a CoMP transmission scheme, that is, a CoMP UE may transmit channel information as feedback (hereinafter, referred to as CSI feedback) to a plurality of BSs that perform a CoMP transmission scheme. A network scheduler may select an appropriate CoMP transmission scheme for increasing a transmission rate among CoMP-JP, CoMP-CS/CB, and DPS methods, based on the CSI feedback. To this end, a CoMP UE may configure the CSI feedback in a plurality of BSs that perform a CoMP transmission scheme according to a periodic feedback transmission scheme using UL PUCCH. In this case, feedback configuration of each BS may be independent from each other. Thus, hereinafter, in this specification, according to an embodiment of the present invention, an operation for transmitting channel information as feedback with independent feedback configuration is referred to as a CSI process. One or more CSI processes may be present in one serving cell.

Figure 11:
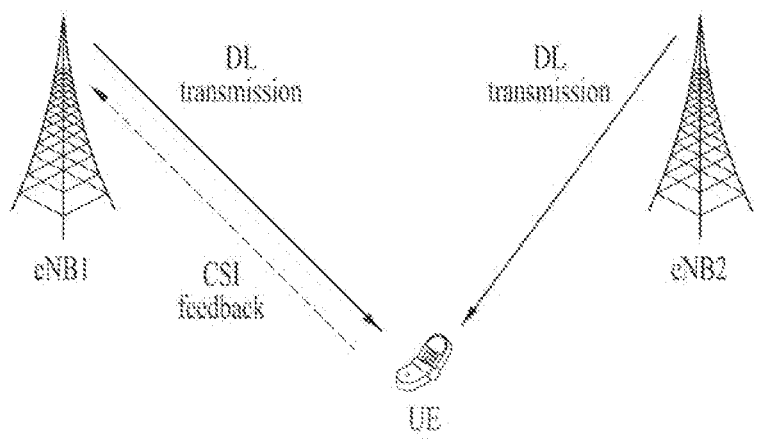
FIG. 11 illustrates a case in which a DL CoMP operation is performed.

FIG. 11 illustrates a case in which a DL CoMP operation is performed.

In FIG. 11, a UE is positioned between eNB1 and eNB2. The two eNBs (i.e., eNB1 and eNB2) perform a CoMP operation such as JT, DCS, and CS/CB in order to overcome interference with the UE. The UE performs appropriate CSI feedback for facilitating the CoMP operation of an eNB. Information transmitted via CSI feedback may include PMI information of each eNB and CQI information and may further include channel information (e.g., phase offset information between the two eNB channels) between the two eNBs for JT.

Although FIG. 11 illustrates a case in which the UE transmits a CSI feedback signal to eNB1 that is a serving cell of the UE, the UE may transmit the CSI feedback signal to eNB2 or the two eNBs according to a situation. In addition, although FIG. 11 illustrates a case in which a basic unit participating in CoMP is eNB, the present invention may be applied to CoMP between transmission points controlled by the eNB.

For CoMP scheduling in a network, the UE needs to feedback DL CSI information of neighboring eNB that participates in CoMP as well DL CSI information of serving eNB. To this end, the UE may feedback a plurality of CSI processes that reflect various data transmission eNB and various interference environments.

Thus, an LTE system uses an interference measurement resource (IMR) for interference measurement during calculation of CoMP CSI. One UE may be configured by a plurality of IMRs which have independent configuration. That is, the IMRs may be configured by independent periods, offsets, and resource configuration, and a BS may signal IMR to a UE via higher-layer signaling (RRC, etc.).

In addition, an LTE system uses CSI-RS in order to measure a channel desired for calculation of CoMP CSI. One UE may be configured by a plurality of CSI-RSs which have independent configurations. That is, each CSI-RS may be configured by independent periods, offsets, resource configuration, power control (Pc), and number of antenna ports. CSI-RS related information may be transmitted to a UE from a BS via higher-layer signaling (RRC, etc.).

Among a plurality of CSI-RSs and a plurality of IMRs configured to the UE, one CSI process may be defined in association with one CSI-RS resource for signal measurement and one interference measurement resource (IMR) for interference measurement. The UE feedbacks CSI information obtained via different CSI processes with independent periods and subframe offsets.

That is, each CSI process has independent CSI feedback configurations. The CSI-RS resource, the IMR resource association information, and the CSI feedback configuration may be indicated to the UE by a BS via higher-layer signaling for each respective CSI process. For example, it is assumed that the UE may be configured by three CSI processes shown in Table 1 below.

TABLE 1

| CSI Process | Signal Measurement Resource (SMR) | IMR |
| --- | --- | --- |
| CSI process 0 | CSI-RS 0 | IMR 0 |
| CSI process 1 | CSI-RS 1 | IMR 1 |
| CSI process 2 | CSI-RS 0 | IMR 2 |

In Table 1 above, CSI-RS 0 and CSI-RS 1 are CSI-RS received from eNB 1 that is a serving eNB of the UE and CSI-RS received from eNB 2 as a neighboring eNB that participates in cooperation, respectively. When it is assumed that IMR configured for each respective CSI process of Table 1 above is configured as shown in Table 2 below,

TABLE 2

| IMR | eNB 1 | eNB 2 |
| --- | --- | --- |
| IMR 0 | Muting | Data transmission |
| IMR 1 | Data transmission | Muting |
| IMR 2 | Muting | Muting |

With regard to IMR 0, eNB 1 performs muting and eNB 2 performs data transmission, and the UE is configured to measure interference from eNBs except for eNB 1 based on IMR 0. Similarly, with regard to IMR 1, eNB 2 performs muting and eNB 1 performs data transmission, and the UE is configured to measure interference from eNBs except for eNB 2 based on IMR 1. In addition, with regard to IMR 2, both eNB 1 and eNB 2 perform muting, and the UE is configured to measure interference from eNBs except for eNB 1 and eNB 2 based on IMR 2.

Accordingly, as shown in Tables 1 and 2 above, CSI information of CSI process 0 refers to optimum RI, PMI, and CQI information when data is received from eNB 1. CSI information of CSI process 1 refers to optimum RI, PMI, and CQI when data is received from eNB 2. CSI information of CSI process 2 refers to optimum RI, PMI, and CQI information when data is received from eNB 1 and interference is not generated from eNB 2.

All IMRs configured for one UE may be indicated by zero power (ZP) CSI-RS. That is, the UE assumes that data of the UE is not mapped in the configured IMR and performs PDSCH rate matching during data reception.

Here, all IMRs are indicated by ZP CSI-RS because a CoMP UE cannot know eNB from which data is actually received. For example, in FIG. 10, during DPS CoMP, the UE does not know eNB among eNB 1 and eNB 2, from which data is actually transmitted, and receives data without separate signaling.

When eNB 1 transmits data and the UE knows the fact, IMR 1 may be used to receive data as well as to measure interference. On the other hand, when eNB 2 transmits data and the UE knows the fact, IMR 0 may be used to receive data as well as to measure interference. However, when the UE does not know eNB that transmits data, it is effective to assume muting with respect to IMR 0 and IMR 1 and perform PDSCH rate matching in order to reduce decoding errors.

According to a method in which all IMRs are indicated by ZP CSI-RS, the UE cannot receive data with respect to all configured IMRs, problems arise in that PDSCH resources are wasted. This is because that UE assumes that data is not transmitted from all configured IMRs and performs PDSCH rate matching.

First Embodiment

Hereinafter, an embodiment of the present invention in which a UE also receives data from configured IMR and more effectively uses PDSCH resource will be described. To this end, the UE receives ZP CSI-RS information for muting per eNB and transmission eNB information indicating eNB that actually transmits data.

The ZP CSI-RS information for muting per eNB may be transmitted to the UE by higher-layer signaling such as RRC signaling, etc. For example, in FIG. 11, eNB 1 performs muting in IMR 0 and IMR 2, and thus, the UE receives ZP CSI-RS information of eNB 1 including IMR 0 and IMR 2. On the other hand, eNB 2 performs muting in IMR 1 and IMR 2, and thus, the UE receives ZP CSI-RS information of eNB 2 including IMR 1 and IMR 2.

ZP CSI-RS information of each eNB includes a period of ZP CSI-RS, subframe offset, and resource configuration. These values may be independently configured for each ZP CSI-RS of each eNB but ZP CSI-RS of each eNB may be limited to have the same period and subframe offset in order to minimize impact on a legacy UE. Through this limitation, the number of subframes, ZP CSI-RS of which is not configured, may be increased and a BS may schedule the legacy UE to the subframe to minimize data decoding error due to data mapping mismatch.

Transmission eNB information indicating eNB that actually transmits data may be dynamically transmitted to the UE from the eNB through DCI in PDCCH. For example, in FIG. 11, when DPS is performed, the UE receives data from eNB 1 or eNB 2. In this case, the UE receives the transmission eNB through a DCI field. In the embodiment of FIG. 11, although there are two eNBs, a maximum of 3 eNBs per UE can perform cooperative communication in a current LTE system, and thus, 2-bit field may be added to DCI to transmit the transmission eNB information. In addition, when the number of eNBs that perform cooperative communication is increased, a field corresponding to the increased number may be added to DCI to transmit the transmission eNB information.

Table 3 below shows an example of the aforementioned 2-bit field. The 2-bit field is defined as a CSI process index or a CSI-RS index. For example, when the 2-bit field is configured as '00', a UE can know that data is received through a DL channel measured using CSI-RS 0.

TABLE 3

| 2 bit DCI field | Alt 1. CSI process index | Alt 2. CSI-RS index |
|---|---|---|
| 00 | CSI process 0 | CSI-RS 0 |
| 01 | CSI process 1 | CSI-RS 1 |
| 10 | CSI process 2 | CSI-RS 2 |
| 11 | Reserved | reserved |

The aforementioned transmission eNB information may be transmitted by adding a new field to DCI or using a reserved bit, use of which is not defined, among fields defined in legacy DCI. For example, some states reserved in 3-bit CIF field defined for CA may be defined as a CSI process index or a CSI-RS index as shown in Table 3 above.

The UE recognizes ZP CSI-RS information of eNB that actually transmits data based on ZP CSI-RS information per eNB and transmission eNB information, assumes that data is not mapped in a corresponding ZP CSI-RS resource element (RE), and performs data demodulation.

When the UE performs rate matching using the aforementioned method, the UE assumes that data is mapped in IMR present outside ZP CSI-RS of eNB that transmits data among configured IMRs and performs data demodulation. That is, in the case of IMR resource contained in the ZP CSI-RS RE of eNB that actually transmits data, the UE assumes that data is not mapped in the corresponding IMR and performs data demodulation. On the other hand, in the case of IMR resource that is not contained in the ZP CSI-RS RE of eNB that actually transmits data, the UE assumes that data is mapped in the corresponding IMR and performs data demodulation.

For example, in FIG. 11, when the transmission eNB information indicates eNB 1, the UE assumes that data is not mapped in IMR 0 and IMR 2 and performs data demodulation. In addition, the UE assumes that data is mapped in IMR 1 and performs data demodulation. On the other hand, when the transmission eNB information indicates eNB 2, the UE assumes that data is not mapped in IMR 1 and IMR 2 and performs data demodulation. In addition, the UE assumes that data is mapped in IMR 0 and performs data demodulation.

Through the aforementioned method, the UE may perform interference measurement using an RE to which data is mapped in IMR. That is, when resource configured as IMR is not further configured as ZP CSI-RS, the UE further determines that PDSCH is mapped to the corresponding resource. Upon receiving PDSCH through IMR that is not configured as ZP CSI-RS, the UE considers all reception signal including the PDSCH receives for interference measurement in the corresponding IMR as interference signals. In addition, the UE determines that a signal for UE, for receiving PDSCH, is present in the corresponding IMR.

At least one eNB performs muting in a CoMP measurement set, and thus, IMR needs to be present in a union of ZP CSI-RS REs of each eNB. That is, the UE does not expect that any one of the ZP CSI-RS REs is configured not to entirely overlap IMR. For example, when two 2 eNBs perform a CoMP operation, the UE is configured by two ZP CSI-RSs. In this case, IMR is present in a union of two ZP CSI-RS REs.

The aforementioned IMR application method has been described in terms of a network for convenience of description. That is, the aforementioned IMR application method has been described in that ZP CSI-RS is configured to each eNB that participates in CoMP and indicates eNB that actually transmits data among eNBs.

From a UE point of view, the UE distinguishes eNBs that participate in CoMP based on configured CSI-RSs. For example, in FIG. 11, the UE distinguishes eNB 1 and eNB 2 through two CSI-RS (i.e., CSI-RS 0 and CSI-RS 1) configured for the UE. Thus, from a UE point of view, an operation for configuring ZP CSI-RS per eNB refers to an operation for configuring ZP CSI-RS per CSI-RS. In addition, an operation for indicating eNB that actually transmits data refers to an operation for indicating a DL channel of CSI-RS, from which data is actually transmitted, from a UE point of view. Accordingly, the UE is configured by ZP CSI-RS information per CSI-RS from a network and is informed of a DL channel of CSI-RS, from which data is actually transmitted. The UE recognizes ZP CSI-RS of eNB that actually transmits data based on the two pieces of information, assumes that data is not mapped in corresponding ZP CSI-RS RE, and performs data demodulation.

In addition, the UE receives a plurality of CSI-RS configurations and receives ZP CSI-RS configuration per CSI-RS. That is, one CSI-RS and one ZP CSI-RS resource are one to one connected. Furthermore, the UE is allocated a plurality of IMRs.

Upon receiving data through PDSCH allocated by DCI including transmission eNB information, the UE assumes that data is not mapped to all plural indicated CSI-RS resources but assumes that data is not mapped to only ZP CSI-RS resource corresponding to CSI-RS indicated by the transmission eNB information with respect to the ZP CSI-RS resource. That is, the UE assumes that data is mapped to resource that is not included in ZP CSI-RS resource corresponding to CSI-RS indicated by transmission eNB information with respect to IMR.

Upon receiving data through PDSCH allocated by DCI (e.g., DCI format 1A that does not include transmission eNB information) that does not include transmission eNB indication information, the UE assumes that data is not mapped to all plural CSI-RS resources but assumes that data is not mapped to only specific resource, for a representative example, first ZP CSI-RS resource (with a lowest index) with respect to ZP CSI-RS resources. That is, the UE assumes that data is mapped to resource that is not included in ZP CSI-RS resource with a lowest index with respect to IMR.

In a different method, upon receiving data through PDSCH allocated by DCI that does not include transmission eNB information, that is, DCI 1A, the UE may assume that data is not mapped to all plural indicated CSI-RS resources and ZP CSI-RS resources. In addition, the UE assumes that data is mapped to resource that is not included in ZP CSI-RS resource with respect to IMR.

Since CSI-RS is RS that is actually transmitted with transmission power and may be referred to as non-zero power (NZP) CSI-RS.

Figure 12:
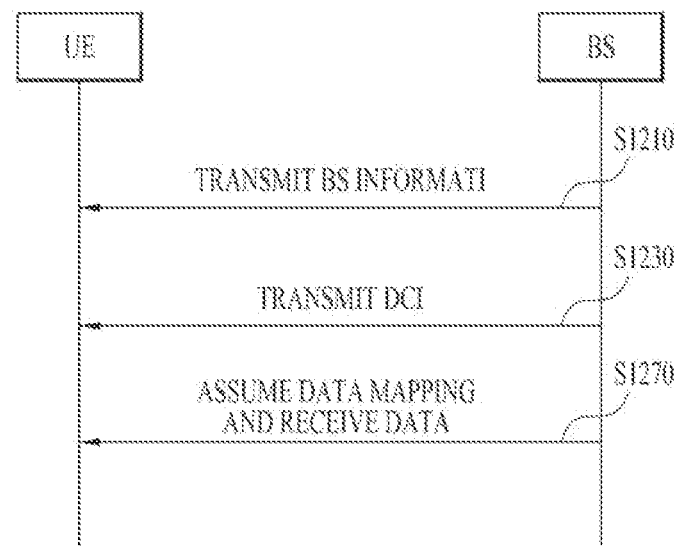
FIG. 12 is a flowchart illustrating a method for receiving data according to a first embodiment of the present invention.

FIG. 12 is a flowchart illustrating a method for receiving data according to a first embodiment of the present invention.

First, a UE receives downlink control information (DCI) that does not contain information that does not contain information indicating a transmission eNB that actually transmits data among a plurality of eNBs that participate in CoMP (S1210). As described above, an example of the DCI that does not contain the information of the transmission eNB may include DCI format 1A.

In addition, the UE receives ZP CSI-RS information for muting per eNB (S1230). Reception of the ZP CSI-RS information by the UE has been described above, and thus, a detailed description thereof will be omitted.

Then, the UE assumes that data is not mapped to a resource element of ZP CSI-RS with a lowest index and receives data through a PDSCH (S1250). As described above, the UE assumes that data is mapped to resource that is not included in ZP CSI-RS resource with a lowest index in IMR and receives data.

Second Embodiment

Although the aforementioned first embodiment relates to PDSCH data mapping, when a UE receives enhance PDCCH (EPDCCH), the same method may be extensively applied to DCI to RE mapping of EPDCCH.

Figure 13:
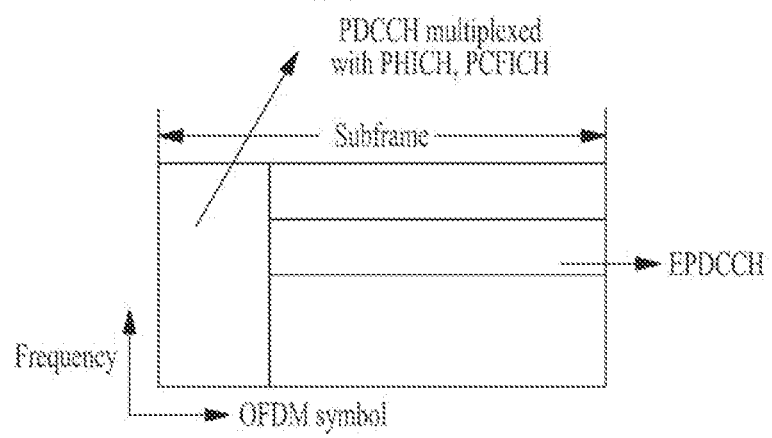
FIG. 13 is a diagram illustrating an example of EPDCCH according to an embodiment of the present invention.

In an LTE system, some regions of PDSCH may be indicated as EPDCCH and the corresponding resource may be used to transmit control information. As illustrated in FIG. 13, the EPDCCH refers to enhanced PDCCH as a control channel transmitted in a PDSCH region instead of a legacy PDCCH. In FIG. 13, frequency resources used for EPDCCH are consecutively arranged, which is purely exemplary. That is, in order to acquire frequency diversity, EPDCCH may be transmitted using spaced frequency resources.

A BS may indicate a plurality of EPDCCH sets to one UE. Here, the EPDCCH set refers to a set of PRBs in which a series of EPDCCH blind decoding candidates are present. PRBs included in the EPDCCH set may be given by higher-layer signaling such as RRC signaling, etc. The UE assumes that each candidate uses resources of the EPDCCH set to which the corresponding candidate belongs upon attempting to detect a specific blind decoding candidate. In addition, the BS may configure various dedicated properties for the respective EPDCCH sets. For example, whether an EPDCCH candidate uses localized transmission or distributed transmission, a parameter used for HARQ ACK when a candidate that belongs to each EPDCCH set uses DL assignment, etc. may be configured.

When the UE is indicated by multiple EPDCCH sets from the BS by RRC, the UE configures the EPDCCH sets as a search space (SS) for decoding DCI and attempts blind decoding with respect to various aggregation levels. Each set may be indicated as multiple PRBs and other sets and some PRBs may overlap.

In this case, other adjacent eNBs as well as a serving eNB may perform EPDCCH transmission to the UE. For example, the following cases may be considered. As a first case, transmission of EPDCCH sets may be performed by different eNBs. As a second case, EPDCCH transmission in PRBs in EPDCCH SS may be performed by different eNBs. As a third case, EPDCCH transmission in EPDCCH DMRS ports may be performed by different eNBs. Hereinafter, each case will be described in detail, and DCI to RE mapping of EPDCCH will be proposed.

As the first case, transmission of EPDCCH sets may be performed by different eNBs. In this case, the BS may signal EPDCCH transmission eNB information of each set to the UE by higher layer signaling such as RRC, etc. The EPDCCH transmission eNB information is a CSI-RS index of EPDCCH transmission eNB. Upon performing blinding decoding on DCI of each set from the information, the UE assumes that DCI is not mapped in ZP CSI-RS RE of EPDCCH transmission eNB of the corresponding set and performs blinding decoding. That is, the UE assumes that DCI is not mapped in ZP CSI-RS that is one to one connected to CSI-RS of the corresponding set and performs blind decoding. The UE assumes that DCI is mapped with respect to IMR present outside the ZP CSI-RS and performs blind decoding.

For example, in FIG. 11, two EPDCCH sets, that is, set 0 and set 1 are configured for the UE, eNB 1 transmits control information in set 0, and eNB 2 transmits control information in set 1. The UE is configured by CSI-RS 0 with respect to set 0 and is configured by CSI-RS 1 with respect to set 1 from the BS by RRC. Upon performing blinding decoding on set 0, the UE assumes that DCI is not mapped in ZP CSI-RS that is one to one connected to CSI-RS 0 and performs blind decoding. On the other hand, upon performing blinding decoding on set 1, the UE assumes that DCI is not mapped in ZP CSI-RS that is one to one connected to CSI-RS 1 and performs blind decoding. The UE assumes that DCI is mapped in IMR present outside the corresponding ZP CSI-RS and performs blind decoding.

An index of CSI-RS connected to each EPDCCH set may be indicated directly through a field in an EPDCCH set configuration message.

In the case of direct indication, one EPDCCH set may be connected to two or more CSI-RSs. In this case, the direct indication can be effectively used for an operation for simultaneously transmitting the same EPDCCH in two or more eNBs.

As another example of direct indication, for easy channel estimation on EPDCCH by the UE, the BS may determine CSI-RS having the same long term characteristics such as Doppler spread or frequency offset as EPDCCH DM RS as a higher-layer signal. The CSI-RS may be, for example, quasi-colocated (QC) CSI-RS to be assumed to be transmitted at the same position. In this case, the higher-layer signal may be reused such that DCI mapping is not performed on specific EPDCCH and QC CSI-RS, and ZP CSI-RS carried thereon.

In addition, an index of CSI-RS connected to each EPDCCH set may be indirectly indicated. For example, EPDCCH set 0 may be automatically connected to CSI-RS 0 and EPDCCH set 1 may be automatically connected to CSI-RS 1.

As the second case, EPDCCH transmission in PRBs in EPDCCH SS may be performed by different eNBs. In this case, the BS may inform the UE of EPDCCH transmission eNB information of each PRB by higher-layer signaling such as RRC, etc. The EPDCCH transmission eNB information is a CSI-RS index of the EPDCCH transmission eNB. Upon performing blind decoding on each PRB from the information, the UE assumes that DCI is not mapped in ZP CSI-RS RE of EPDCCH transmission eNB of the corresponding PRB and performs blind decoding. That is, the UE assumes that DCI is not mapped in ZP CSI-RS that is one to one connected to CSI-RS of the corresponding PRB and performs blind decoding. The UE assumes that DCI is mapped in IMRs present outside the ZP CSI-RS and performs blind decoding.

For example, in FIG. 11, two PRBs in EPDCCH SS, that is, PRB 0 and PRB 1 are configured for the UE, eNB 1 transmits control information in PRB 0, and eNB 2 transmits control information in PRB 1. The UE is configured by CSI-RS 0 with respect to PRB 0 and is configured by CSI-RS 1 with respect to PRB 1 from the BS by RRC. Upon performing blinding decoding on PRB 0, the UE assumes that DCI is not mapped in ZP CSI-RS that is one to one connected to CSI-RS 0 and performs blind decoding. On the other hand, upon performing blinding decoding on PRB 1, the UE assumes that DCI is not mapped in ZP CSI-RS that is one to one connected to CSI-RS 1 and performs blind decoding. The UE assumes that DCI is mapped in IMR present outside the corresponding ZP CSI-RS and performs blind decoding.

In addition, when EPDCCH transmission of PRBs in EPDCCH SS is performed by different eNBs, DCI to RE mapping may be performed using the following method. Upon performing blind decoding in each PRB, the UE searches for CSI-RS having the same CSI-RS scrambling ID as scrambling ID of DMRS allocated to the corresponding PRB among configured multiple CSI-RSs. Then, the UE assumes that DCI is not mapped in ZP CSI-RS that is one to one connected to the CSI-RS and performs blind decoding.

In addition, the BS and the UE may search for CSI-RS using a mapping table between CSI-RS scrambling ID and scrambling ID of predefined DMRS. The mapping table may be indicated to the UE from the BS by RRC. Then, the UE assumes that DCI is not mapped in ZP CSI-RS that is one to one connected to the CSI-RS and performs blind decoding.

As the third case, EPDCCH transmission in EPDCCH DMRS ports may be performed by different eNBs. In this case, the BS may inform the UE of EPDCCH transmission eNB information of each DMRS port by higher-layer signaling such as RRC, etc. The EPDCCH transmission eNB information is a CSI-RS index of the EPDCCH transmission eNB. Upon performing blind decoding on each DMRS port from the information, the UE assumes that DCI is not mapped in ZP CSI-RS RE of EPDCCH transmission eNB of the corresponding DMRS port and performs blind decoding. That is, the UE assumes that DCI is not mapped in ZP CSI-RS that is one to one connected to CSI-RS of the corresponding DMRS port and performs blind decoding. The UE assumes that DCI is mapped in IMRs present outside the ZP CSI-RS and performs blind decoding.

For example, in FIG. 11, the UE may receive EPDCCH through DMRS port 7 and DMRS port 9. In this case, eNB 1 transmits control information through DMRS port 7 and eNB 2 transmits control information through DMRS port 9. The UE is configured by CSI-RS 0 with respect to DMRS port 7 and is configured by CSI-RS 1 with respect to DMRS port 9 from the BS by RRC. Upon performing blind decoding on DMRS port 7, the UE assumes that DCI is not mapped in ZP CSI-RS that is one to one connected to CSI-RS 0 and performs blind decoding. On the other hand, upon performing blind decoding on DMRS port 9, the UE assumes that DCI is not mapped in ZP CSI-RS that is one to one connected to CSI-RS 1 and performs blind decoding.

The UE assumes that DCI is mapped in IMRs present outside the corresponding ZP CSI-RS and performs blind decoding.

Thus far, the DCI to RE mapping method of EPDCCH has been described in terms of the three cases in which a plurality of eNBs transmits EPDCCH to the UE. Briefly, with respect to all eNBs that can transmit EPDCCH to the UE, DCI to RE mapping may be determined using a union of ZP CSI-RSs of each eNB. That is, the UE receives union information of ZP CSI-RSs of the eNB from a network and assumes that DCI is not mapped with respect to all configured ZP CSI-RSs during blind decoding of the EPDCCH.

Third Embodiment

In the aforementioned method, in order to determine whether data of IMR is mapped or whether DCI of IMR is mapped, ZP CSI-RS information and transmission eNB information per eNB are transmitted. Thus, the UE can indirectly recognize whether data/DCI is mapped in IMR, from ZP CSI-RS information of data transmission eNB. In addition, as another method, information about whether data of IMR is mapped or whether DCI of IMR is mapped may be received directly from DCI as follows.

For example, as shown in Table 4 below, 3-bit field may be added to DC and whether data is mapped may be signaled to the UE. The UE receives information of Table 4 through the DCI and assumes that data is not mapped in IMR configured by muting. The UE assumes that data is mapped in IMR configured by data transmission.

TABLE 4

| New DCI field | IMR 0 | IMR 1 | IMR 2 |
| --- | --- | --- | --- |
| 000 | Mute | Mute | Mute |
| 001 | Mute | Mute | Data |
| 010 | Mute | Data | Mute |
| 011 | Data | Mute | Mute |
| 100 | Mute | Data | Data |
| 101 | Data | Mute | Data |
| 110 | Data | Data | Mute |
| 111 (reserved) | | | |

For example, in FIG. 11, upon receiving data from eNB 1, the UE receives '010' from the BS through the DCI field. The UE assumes that data is mapped in IMR 1, does not assume that data is mapped in IMR 0 and IMR 2, and performs data demodulation. On the other hand, upon receiving data from eNB 2, the UE receives '011' from the BS through the DCI field. The UE assumes that data is mapped with respect to IMR 0, does not assume that data is mapped with respect to IMR 1 and IMR 2, and performs data demodulation.

In addition, as shown in Table 4 above, a new field may not be added and whether data of IMR is mapped may be determined using initial value information of DMRS sequence in DCI. For example, when the initial value can be configured by 0 and 1 and the UE is set by 0, the UE assumes that data is mapped with respect to only IMR 0 among configured IMRs. The UE assumes that data is mapped with respect to only IMR 1 among configured IMRs. In the aforementioned example, the initial value is limited to 1 bit. However, according to an available bit number, more data mapping IMRs may be configured for the UE.

As described above, upon receiving information about whether data of IMR is mapped or whether DCI of IMR is mapped directly through DCI, the UE receives one piece of ZP CSI-RS information from the BS and determines whether data/DCI is mapped with respect to the remaining resources except for the IMR. The one piece of ZP CSI-RS information indicates a union of ZP CSI-RSs of each eNB. For example, in FIG. 11, when ZP CSI-RS of eNB 1 is allocated to resources 1, 2, and 3 and when ZP CSI-RS of eNB 2 is allocated to resources 3, 4, and 5, the UE recognizes that ZP CSI-RS is allocated to resources 1, 2, 3, 4, and 5 through the one piece of ZP CSI-RS information and assumes that data/DCI is not mapped in the corresponding resource.

Figure 14:
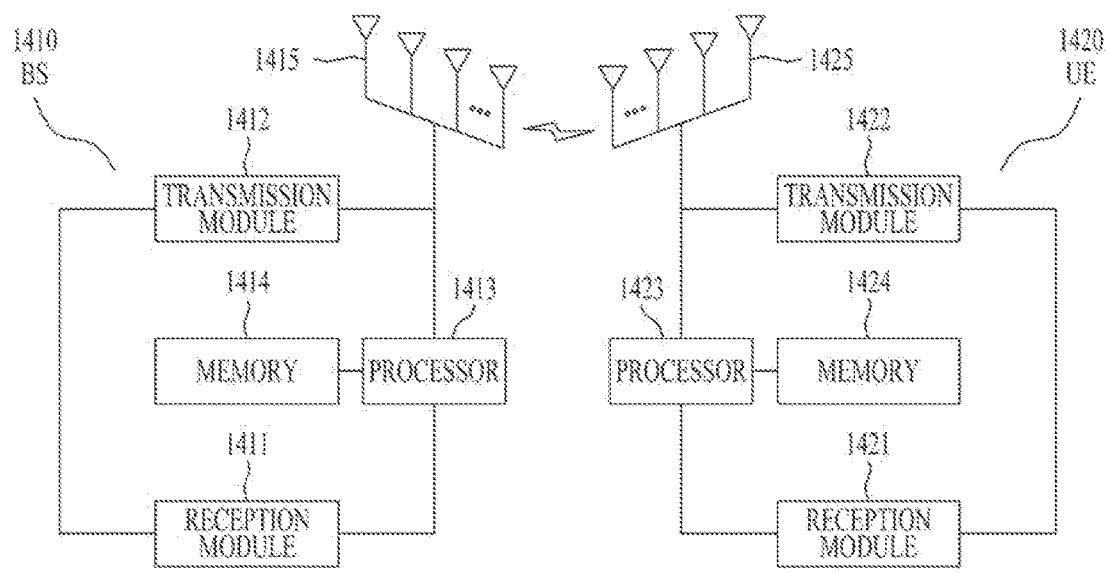
FIG. 14 is a diagram illustrating a BS and a UE to which an embodiment of the present invention can be applicable.

FIG. 14 is a diagram illustrating a BS and a UE to which an embodiment of the present invention can be applicable.

When a relay is included in a wireless communication system, communication in backhaul link is performed between the BS and the relay and communication in access link is performed between the relay and the UE. Accordingly, the BS and UE illustrated in FIG. 13 can be replaced by a relay according to a situation.

Referring to FIG. 14, a wireless communication system includes a BS 1410 and a UE 1420. The BS 1410 includes a processor 1413, a memory 1414, and a radio frequency (RF) unit 1411 and 1412. The processor 1413 may be configured to embody procedures and/or methods proposed according to the present invention. The memory 1414 is connected to the processor 1413 and stores various information related to an operation of the processor 1413. The RF unit 1411 and 1412 is connected to the processor 1413 and transmits/receives a radio signal. The UE 1420 includes a processor 1423, a memory 1424, and an RF unit 1421 and 1422. The processor 1423 may be configured to embody procedure and/or methods proposed according to the present invention. The memory 1424 is connected to the processor 1423 and stores various information related to an operation of the processor 1423. The RF unit 1421 and 1422 is connected to the processor 1423 and transmits/receives a radio signal. The BS 1410 and/or the UE 1420 may have a single antenna or a multiple antenna. The aforementioned embodiments of the present invention described are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

In the embodiments of the present invention, a specific operation described as being performed by the BS may be performed by an upper node of the BS. Namely, it is apparent that, in a network comprised of a plurality of network nodes including a BS, various operations performed for communication with a UE may be performed by the BS, or network nodes other than the BS. The term 'BS' may be replaced with a fixed station, a Node B, an eNode B (eNB), an access point, etc.

The embodiments according to the present invention can be implemented by various means, for example, hardware, firmware, software, or combination thereof. In a hardware configuration, the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, the embodiments of the present invention can be implemented by a type of a module, a procedure, or a function, which performs functions or operations described above. Software code may be stored in a memory unit and then may be executed by a processor.

The memory unit may be located inside or outside the processor to transmit and receive data to and from the processor through various means which are well known.

The detailed description of the preferred embodiments of the present invention is given to enable those skilled in the art to realize and implement the present invention. While the present invention has been described referring to the preferred embodiments of the present invention, those skilled in the art will appreciate that many modifications and changes can be made to the present invention without departing from the spirit and essential characteristics of the present invention. For example, the structures of the above-described embodiments of the present invention can be used in combination. The above embodiments are therefore to be construed in all aspects as illustrative and not restrictive. Therefore, the present invention intends not to limit the embodiments disclosed herein but to give a broadest range matching the principles and new features disclosed herein.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. Therefore, the present invention intends not to limit the embodiments disclosed herein but to give a broadest range matching the principles and new features disclosed herein. It is obvious to those skilled in the art that claims that are not explicitly cited in each other in the appended claims may be presented in combination as an embodiment of the present invention or included as a new claim by a subsequent amendment after the application is filed.

INDUSTRIAL APPLICABILITY

The above-described embodiments of the present invention can be applied to a wireless communication system such as a user equipment (UE), a relay, a base station (BS), etc.

The invention claimed is:

1. A method of receiving a physical downlink shared channel (PDSCH) by a user equipment (UE), the method comprising:
   receiving information on multiple zero power channel state information-reference signal (ZP CSI-RS) resources;
   receiving, via a physical downlink control channel (PDCCH), downlink control information (DCI) scheduling a PDSCH;
   determining a PDSCH resource based on the DCI by assuming that the PDSCH is not mapped to one of the multiple ZP CSI-RS resources; and
   performing demodulation for the PDSCH resource based on a cell-specific reference signal (CRS),
   wherein when the DCI corresponds to a predetermined DCI format, a ZP CSI-RS resource, selected using a lowest index among the multiple ZP CSI-RS resources is determined to be the one ZP CSI-RS resource to which the PDSCH is not mapped.

2. The method of claim 1, wherein the predetermined DCI format is DCI format 1A.

3. The method of claim 1, wherein the predetermined DCI format does not include a field that identifies the one ZP CSI-RS resource.

4. The method of claim 1, wherein in determining the PDSCH resource, the UE assumes that the PDCCH is mapped to ZP CSI-RS resources other than the one ZP CSI-RS resource.

5. The method of claim 1, wherein the multiple ZP CSI-RS resources are associated with coordinated multi-point (COMP) operation.

6. The method of claim 1, further comprising:
   receiving information on one or more interference measurement resources (IMRs) via radio resource control (RRC) signaling.

7. The method of claim 6, wherein each of the one or more IMRs exists within any one of the multiple ZP CSI-RS resources.

8. A non-transitory computer readable medium recorded thereon a program for executing the method of claim 1.

9. A user equipment (UE) for receiving a physical downlink shared channel (PDSCH), the UE comprising:
   a receiver that receives information on multiple zero power channel state information-reference signal (ZP CSI-RS) resources, and receives, via a physical downlink control channel (PDCCH), downlink control information (DCI) scheduling a PDSCH; and
   a processor that determines a PDSCH resource based on the DCI by assuming that the PDSCH is not mapped to one of the multiple ZP CSI-RS resources, and performs demodulation for the PDSCH resource based on a cell-specific reference signal (CRS),
   wherein when the DCI corresponds to a predetermined DCI format, a ZP CSI-RS resource selected using a lowest index among the multiple ZP CSI-RS resources is determined to be the one ZP CSI-RS resource to which the PDSCH is not mapped.

10. The UE of claim 9, wherein the predetermined DCI format is DCI format 1A.

11. The UE of claim 9, wherein the predetermined DCI format does not include a field that identifies the one ZP CSI-RS resource.

12. The UE of claim 9, wherein in determining the PDSCH resource, the processor assumes that the PDCCH is mapped to ZP CSI-RS resources other than the one ZP CSI-RS resource.

13. The UE of claim 9, wherein the multiple ZP CSI-RS resources are associated with coordinated multi-point (COMP) operation.

14. The UE of claim 9, wherein the receiver receives information on one or more interference measurement resources (IMRs) via radio resource control (RRC) signaling.

15. The method of claim 14, wherein each of the one or more IMRs exists within any one of the multiple ZP CSI-RS resources.

* * * * *